(12) United States Patent
Yokoyama

(10) Patent No.: US 7,855,837 B2
(45) Date of Patent: Dec. 21, 2010

(54) VIEWING OPTICAL SYSTEM AND IMAGING APPARATUS INCORPORATING THE SAME

(75) Inventor: Keitaro Yokoyama, Hachioji (JP)

(73) Assignee: Olympus Imaging Corp., Tokyo (JP)

(*) Notice: Subject to any disclaimer, the term of this patent is extended or adjusted under 35 U.S.C. 154(b) by 56 days.

(21) Appl. No.: 12/384,769

(22) Filed: Apr. 7, 2009

(65) Prior Publication Data
US 2009/0262434 A1  Oct. 22, 2009

(30) Foreign Application Priority Data
Apr. 8, 2008  (JP) ............................. 2008-099977

(51) Int. Cl.
*G02B 25/00* (2006.01)
(52) U.S. Cl. ...................... 359/645; 359/726; 359/737; 396/384; 396/386
(58) Field of Classification Search .................. 359/644, 359/645, 726–735, 737, 784; 396/382, 384–386
See application file for complete search history.

(56) References Cited

U.S. PATENT DOCUMENTS

| | | | | |
|---|---|---|---|---|
| 6,263,168 | B1 * | 7/2001 | Hasushita et al. ........... | 396/382 |
| 6,692,163 | B2 * | 2/2004 | Ogata ......................... | 396/354 |
| 2005/0013011 | A1 | 1/2005 | Ohshita | |
| 2006/0066950 | A1 | 3/2006 | Mitsuki et al. | |

FOREIGN PATENT DOCUMENTS

| | | |
|---|---|---|
| JP | 2000-98266 | 4/2000 |
| JP | 2001-100115 | 4/2001 |
| JP | 2001-311881 | 11/2001 |
| JP | 2001-324684 | 11/2001 |
| JP | 2004-258234 | 9/2004 |
| JP | 2005-55874 | 3/2005 |
| JP | 2006-98948 | 4/2006 |

* cited by examiner

*Primary Examiner*—Darryl J Collins
(74) *Attorney, Agent, or Firm*—Kenyon & Kenyon LLP

(57) ABSTRACT

The invention provides a viewing optical system comprising:
a screen on which an object image by a taking lens is formed,
an image erection optical system for erecting the object image formed on the screen, and
an eyepiece lens system of positive refracting power for guiding a light beam leaving the image erection optical system to the eyeball of a viewer, wherein:
the image erection optical system comprises a plurality of reflecting surfaces,
the eyepiece optical system comprises, in order from a screen side to an exit pupil side,
a first lens element of negative refracting power,
a second lens element convex on both the screen side and the exit pupil side, and
a third lens element that is of negative refracting power and has a meniscus shape concave on the exit pupil side, and
the third lens element satisfies the following condition (1):

$$0.13 < DL3/fe < 0.30 \qquad (1)$$

where DL3 is the axial thickness of the third lens, and
fe is the focal length of the eyepiece lens system provided that when the eyepiece lens system has a diopter adjustable by movement of the lenses, fe is going to be a focal length at −1 diopter.

17 Claims, 13 Drawing Sheets

Example 1

Example 1

VIEWING OPTICAL SYSTEM AND IMAGING APPARATUS INCORPORATING THE SAME

This application claims benefit of Japanese Application No. 2008-099977 filed in Japan on Apr. 8, 2008, the contents of which are incorporated by this reference.

BACKGROUND OF THE INVENTION

The present invention relates to a viewing optical system for viewing an object image formed on a focusing screen, and an imaging apparatus incorporating the same.

So far, a single-lens reflex camera that is a sort of imaging apparatus using film or an electronic imaging device has comprised an image erection optical system such as a penta roof prism and an eyepiece lens system for guiding a light beam leaving that image erection optical system to the eyeball of a viewer for the purpose of viewing an object image on a focusing screen onto which a subject's image is projected by a taking lens.

Among such viewing optical systems, there is an optical system wherein the eyepiece lens system is made up of three lenses: in order from its object side, a negative lens, a double-convex positive lens and a negative meniscus lens convex on its exit pupil side, with diopter adjustment implemented by moving the double-convex positive lens in the optical axis direction, as set forth in the following patent publications 1 to 7.

In such viewing optical systems, the eyepiece lens has a symmetric refracting power profile of negative, positive and negative and the positive lens has convex surfaces on both sides so that correction of spherical aberrations, etc. are improved. And the negative lens on the exit pupil side is configured into a meniscus shape so that the principal points of the eyepiece lens are positioned near the screen side while keeping small the angle of incidence of an off-axis chief ray. An aspheric surface is applied to the double-convex positive lens on which positive refracting power concentrates for correction of various aberrations, and diopter adjustment is implemented by moving the double-convex positive lens along the optical axis.

Patent Publication 1: JP(A)2000-98266
Patent Publication 2: JP(A)2001-100115
Patent Publication 3: JP(A)2001-311881
Patent Publication 4: JP(A)2001-324684
Patent Publication 5: JP(A)2004-258234
Patent Publication 6: JP(A)2005-55874
Patent Publication 7: JP(A)2006-98948

However, the eyepiece lens system in the viewing optical systems set forth in the aforesaid patent publications 1 to 7 has a long focal length and does not lend itself to size reductions, because when it is desired to view images over a wide field of view, there is the need of increasing image size on the focusing screen.

In recent years, digital single-lens reflex cameras have caught on as imaging apparatus. However, imaging plane size is smaller than conventional Leica film's imaging plane size, and so use of the aforesaid viewing optical system is likely to make the viewing angle of field small.

An object of the invention is to provide an easy-to-view viewing optical system that is capable of viewing objects while the field of view is ensured, albeit being structurally simplified by contriving an eyepiece lens system, as well as an imaging apparatus incorporating the same.

SUMMARY OF THE INVENTION

The aforesaid object is accomplishable by the provision of the following inventive viewing optical system, and an imaging apparatus incorporating the same.

More specifically, the invention provides a viewing optical system comprising a screen on which an object image by a taking lens is formed, an image erection optical system for erecting the object image formed on said screen, and an eyepiece lens system of positive refracting power for guiding a light beam leaving said image erection optical system to the eyeball of a viewer, wherein said image erection optical system comprises a plurality of reflecting surfaces, said eyepiece optical system comprises, in order from a screen side to an exit pupil side, a first lens of negative refracting power, a second lens convex on both the screen side and the exit pupil side and a third lens that is of negative refracting power and has a meniscus shape concave on the exit pupil side, and said third lens satisfies the following condition (1):

$$0.13 < DL3/fe < 0.30 \quad (1)$$

where $DL3$ is the axial thickness of the third lens, and $fe$ is the focal length of the eyepiece lens system provided that when the eyepiece lens system has a diopter adjustable by movement of the lenses, $fe$ is going to be a focal length at $-1$ diopter.

If the eyepiece lens system has a lens arrangement comprising, in order from the screen side to the exit pupil side, the negative lens, the positive lens and the negative lens as described above, it then favors the symmetry of a refracting power profile in the eyepiece lens system, working for correction of spherical aberrations, etc.

If both surfaces of the second lens that is a positive lens are of concave shape, it then permits the positive refracting power of the second lens, on which the positive refracting power of the lens system concentrates, to be shared by both refractive surfaces, making it easy to reduce aberrations and permit the whole eyepiece lens system to have positive refracting power.

If the third lens is configured into the aforesaid shape, it then makes it easy to keep small the angle of incidence of an off-axis chief ray on the third lens, easily getting rid of influences of the decentration of the third lens on aberrations.

The inventive eyepiece lens system composed of fewer lenses favors cost.

And the inventive viewing optical system is characterized in that the axial thickness of the third lens satisfies the aforesaid condition (1).

Avoiding being short of the lower limit of 0.13 to condition (1) is preferable, because it makes sure the thickness of the third lens, working for adjustment of principal points and correction of field curvature.

Avoiding being in excess of the upper limit of 0.30 to condition (1) is preferable, because it facilitates making sure an eye point (the distance from the eyepiece lens system to the exit pupil).

Thus, if the third lens is composed of a negative lens having a proper thickness that satisfies condition (1), then it brings the principal points of the third lens itself to a position nearer to the exit pupil and keeps the exit pupil side refractive surface of the third lens, on which the negative refracting power of the third lens concentrates, properly far away from the first and second lenses, so that the focal length of the eyepiece lens system can easily be shortened and influences of aberrations at that time can favorably be held back.

For the aforesaid inventions, it is more preferable to satisfy at least any one of the following requirements.

For the material of the third lens it is preferable to satisfy the following condition (2):

$$1.40 < NL3 < 2.20 \tag{2}$$

where NL3 is the d-line refractive index of the third lens.

Condition (2) defines the preferable refractive index of the second lens.

Avoiding being short of the lower limit of 1.40 to condition (2) enables the absolute value of the curvature of the third lens surfaces to be kept small, making it easy to properly hold back various aberrations. It also facilitates making sure the negative refracting power and the eye point.

Avoiding being in excess of the upper limit of 2.20 to condition (2) is preferable because material cost can be slashed. Note here that use of high-refractive-index material is likely to cause inherent absorption of shorter wavelengths. With the requirement here, however, it is easily prevented, favoring the elimination of a yellowish hue.

For the shape of the third lens it is preferable to satisfy the following condition (3):

$$1.6 < (RL3S + RL3E)/(RL3S - RL3E) < 4.7 \tag{3}$$

where RL3S is the paraxial radius of curvature of the third lens on the screen side, and RL3E is the paraxial radius of curvature of the third lens on the exit pupil side.

Condition (3) defines the preferable shape of the third lens.

Avoiding being short of the lower limit of 1.6 to condition (3) enables the chief ray of off-axis rays to be incident on the refractive surface at an angle approximate to vertical so that field curvature and astigmatism occurring on the screen side surface can easily be held back.

Avoiding being in excess of the upper limit of 4.7 to condition (3) keeps the refracting power of the exit pupil side surface so small that aberrations can easily be prevented. It is also preferable in that when the principal point position of the whole eyepiece lens system is brought near to the screen side, the principal point position of the third lens is prevented from drawing too near to the pupil side, and in view of fabrication as well.

For the third lens it is preferable to satisfy the following condition (4):

$$-2.1 < fL3/fe < -0.8 \tag{4}$$

where fL3 is the focal length of the third lens.

Condition (4) defines the preferable focal length of the third lens.

Avoiding being short of the lower limit of −2.1 to condition (4) enables the refracting powers of the first and second lenses to be increased to a certain degree so that off-axis light rays at the first lens can be kept low, and so the diameter of the first lens can easily be kept small. It also works for size reductions of the image erection optical system. For instance, when the image erection optical system is a penta roof prism, the height of that prism is kept low to a preferable level.

Avoiding being in excess of the upper limit of −0.8 to condition (4) prevents the refracting powers of the first and second lenses from growing larger than required so that deterioration from decentration is avoidable. It also helps hold back the refracting power of the first lens so that the second lens can be nearer to the screen side. Consequently, the principal point position of the eyepiece lens system can be nearer to the screen side. This is preferable for shortening the lens focal length and raising magnification.

Preferably, any one of the convex surfaces of the second lens is an aspheric surface configured such that the absolute value of curvature becomes small with a distance from the optical axis.

The second lens has positive refracting power likely to grow strong, and is located at a position where an on-axis light beam is properly away from an off-axis light beam. For this reason, if the aforesaid aspheric surface is applied to the second lens, it then facilitates correction of both on-axis aberrations and off-axis aberrations.

Preferably, the second lens moves in the axial direction for diopter adjustment.

It is easy to give proper refracting power to the second lens: the second lens is preferably allowed to move for diopter adjustment thereby saving diopter adjustment space.

For the second lens it is preferable to satisfy the following condition (5):

$$0.13 < DL2/fe < 0.24 \tag{5}$$

where DL2 is the axial thickness of the second lens.

Condition (5) defines the preferable axial thickness of the second lens.

It is preferable to avoid being short of the lower limit of 0.13 to condition (5), because aberrations produced at the second lens are held back while keeping small the absolute value of curvature of both convex surfaces of the second lens.

Avoiding being in excess of the upper limit of 0.24 to condition (5) is preferable in view of fabrication considerations. Properly holding back the thickness of the second lens helps prevent the distance between the screen and the third lens from growing too long. This favors correction of aberrations because the principal point position of the eyepiece lens can easily be brought nearer to the screen side while keeping the refracting power of the third lens small.

For the material of the second lens it is preferable to satisfy the following condition (6):

$$1.40 < NL2 < 2.2 \tag{6}$$

where NL2 is the d-line refractive index of the second lens.

Condition (6) defines the preferable refractive index of the second lens.

Avoiding being short of the lower limit of 1.40 to condition (6) makes it easy to diminish the absolute value of curvature of the second lens, properly holding back various aberrations. It also helps hold back deterioration upon decentration of the second lens.

Avoiding being in excess of the upper limit of 2.2 to condition (6) is preferable because material cost can be slashed. Note here that use of high-refractive-index material is likely to cause inherent absorption of shorter wavelengths. With the requirement here, however, it is easily prevented, favoring the elimination of a yellowish hue.

For the shape of the second lens it is preferable to satisfy the following condition (7):

$$-0.60 < (RL2S + RL2E)/(RL2S - RL2E) < -0.30 \tag{7}$$

where RL2S is the paraxial radius of curvature of the second lens on the screen side, and RL2E is the paraxial radius of curvature of the second lens on the exit pupil side.

Condition (7) defines the preferable shape of the second lens.

Avoiding being short of the lower limit of −0.60 and in excess of the upper limit of −0.30 to condition (7) is preferable, because the refracting power is shared with both surfaces so that deterioration from decentration can be held back.

This is also preferable for holding back various aberrations, because the surface of the second lens on the screen side has aberration cancellation relations to the first lens, and the surface of the second lens on the exit pupil side has aberration cancellation relations to the surface of the third lens on the screen side.

For the second lens it is also preferable to satisfy the following condition (8):

$$0.3 < fL2/fe < 0.55 \tag{8}$$

where fL2 is the focal length of the second lens.

Condition (8) defines the more preferable refracting power of the second lens.

Avoiding being short of the lower limit of 0.3 to condition (8) favors reductions of various aberrations and reductions of aberration fluctuations from decentration, because the refracting power of the second lens is held back and the positive refracting power is shared also with the convex surface of the third lens on the screen side.

It is preferable to avoid being in excess of the upper limit of 0.55 to condition (8), because it is possible to make sure the second lens has positive refracting power, and make sure the eyepiece lens system has refracting power, and get hold of the function of bringing the principal points nearer to the screen as well. It also permits the refracting power of the first lens to increase so that off-axis light rays are kept low, making sure size reductions and the eye point.

For the first lens it is preferable to satisfy the following condition (9):

$$0.025 < DL1/fe < 0.08 \tag{9}$$

where DL1 defines the axial thickness of the first lens.

Condition (9) defines the preferable axial thickness of the first lens.

Avoiding the lower limit of 0.025 to condition (9) facilitates making sure thickness and strength in view of fabrication.

Avoiding being in excess of the upper limit of 0.08 to condition (9) is preferable for shortening the lens focal length, because the second lens can be brought nearer to the screen side with the consequence that the principal point position can be nearer to the screen side.

For the material of the first lens it is preferable to satisfy the following condition (10):

$$1.4 < NL1 < 2.2 \tag{10}$$

where NL1 is the d-line refracting index of the first lens.

Condition (10) defines the preferable refractive index of the first lens.

Avoiding being short of the lower limit of 1.4 to condition (10) enables the absolute value of curvature of the first lens to be kept small so that various aberrations can properly be held back. This also favors prevention of deterioration upon decentration. Further, it is easy to make the first lens thin so that the second lens can be brought nearer to the screen side with the result that the principal point position can be nearer to the screen side, thereby shortening the lens focal length.

Avoiding being in excess of the upper limit of 2.2 to condition (10) is preferable for slashing material cost. Note here that use of high-refractive-index material is likely to cause inherent absorption of shorter wavelengths. With the requirement here, however, it is easily prevented, favoring the elimination of a yellowish hue.

For the shape of the first lens it is preferable to satisfy the following condition (11):

$$0.8 < (RL1S+RL1E)/(RL1S-RL1E) < 3.0 \tag{11}$$

where RL1S is the paraxial radius of curvature of the first lens on the screen side, and RL1E is the paraxial radius of curvature of the first lens on the exit pupil side.

Condition (11) defines the preferable shape of the first lens.

It is preferable to avoid being short of the lower limit of 0.8 to condition (11), because the curvature of the pupil side surface of the first lens comes close to that of the screen side surface of the second lens so that various aberrations are mutually canceled out, holding back field curvature and astigmatism throughout the whole system. This is also preferable in that off-axis rays at the second lens are kept low, leading to efficient space use and reductions of aberrations produced at the second lens.

It is preferable to avoid being in excess of the upper limit of 3.0 to condition (11), because the curvature of the pupil side surface of the first lens comes close to that of the screen side surface of the second lens so that various aberrations are mutually canceled out, holding back field curvature and astigmatism throughout the whole system.

For the eyepiece lens system it is preferable to satisfy the following condition (12):

$$-0.70 < fL2/fL1 < -0.30 \tag{12}$$

where fL1 is the focal length of the first lens, and fL2 is the focal length of the second lens.

Condition (12) defines the more preferable balance between the refracting powers of the first lens and the second lens.

Avoiding being short of the lower limit of −0.70 to condition (12) is preferable, because the negative refracting power of the first lens is kept properly small, working for size reductions of the eyepiece lens system.

Avoiding being in excess of the upper limit of −0.30 to condition (12) is preferable, because it is possible to make sure the first lens has negative refracting power, thereby getting hold of functions of correcting aberrations and making the field of view wide.

For an air lens created between the first lens and the second lens it is preferable to satisfy the following condition (13):

$$3.0 < (RL1E+RL2S)/(RL1E-RL2S) < 9.0 \tag{13}$$

where RL1E is the paraxial radius of curvature of the first lens on the exit pupil side, and RL2S is the paraxial radius of curvature of the second lens on the screen side.

Avoiding being short of the lower limit of 3.0 to condition (13) is preferable for holding back various aberrations, because the screen side surface of the second lens has aberration cancellation relations to the pupil side surface of the first lens.

Avoiding being in excess of 9.0 to condition (13) is preferable for reducing deterioration upon decentration, because aberrations at any one of the first and second lenses alone are held back.

Preferably, the image erection optical system is a penta roof prism having a roof reflective surface.

The penta roof prism allows an optical path to be bent within limited space, working for size reductions of the image erection optical system. It is also possible to shorten the distance, as calculated on an air basis, from the screen to the eyepiece lens system, working for making sure the magnification of the eyepiece lens system.

For the imaging apparatus of the invention, it is preferable to have an imaging device located on a taking optical path and adapted to receive and convert an image formed through the taking lens into electrical signals, a reflecting mirror that splits an optical path from the taking lens into a viewing optical path and a taking optical path, and a viewing optical system located on the viewing optical system side.

An imaging device is more likely to be restricted by the angle of incidence of light rays than film. For this reason, the imaging plane size of the imaging device is often made properly small to allow the taking lens, too, to have proper size while the light rays are kept incident on the light-receiving surface of the imaging device in a state approximate to vertical.

On the other hand, the small imaging surface is likely to cause the field of view to become narrow too. Thus, it is preferable to use the viewing optical system of the invention, thereby setting up an imaging apparatus that is capable of viewing objects over a wide field of view, although it is of small-format size.

There are occasions when it is preferable to satisfy two or more such inventions as mentioned above at the same time, because it works favorably for size reductions, improved performance, etc.

It is also preferable to satisfy two or more such conditions as described above at the same time.

More preferably, the respective conditions should be changed as follows.

More preferably, the lower and upper limits of condition (1) should be changed to 0.14, especially 0.15, and 0.28, especially 0.26, respectively.

More preferably, the lower and upper limits of condition (2) should be changed to 1.45, especially 1.49, and 2.00, especially 1.82, respectively.

More preferably, the lower and upper limits of condition (3) should be changed to 1.7, especially 1.8, and 4.5, especially 4.3, respectively.

More preferably, the lower and upper limits of condition (4) should be changed to −2.00, especially −1.95, and −0.85, especially −0.90, respectively.

More preferably, the lower and upper limits of condition (5) should be changed to 0.15, especially 0.16, and 0.22, especially 0.20, respectively.

More preferably, the lower and upper limits of condition (6) should be changed to 1.45, especially 1.49, and 2.00, especially 1.82, respectively.

More preferably, the lower and upper limits of condition (7) should be changed to −0.50, especially −0.45, and −0.35, especially −0.37, respectively.

More preferably, the lower and upper limits of condition (8) should be changed to 0.35, especially 0.39, and 0.50, especially 0.47, respectively.

More preferably, the lower and upper limits of condition (9) should be changed to 0.030, especially 0.035, and 0.070, especially 0.060, respectively.

More preferably, the lower and upper limits of condition (10) should be changed to 1.45, especially 1.49, and 2.00, especially 1.82, respectively.

More preferably, the lower and upper limits of condition (11) should be changed to 0.9, especially 1.0, and 2.8, especially 2.5, respectively.

More preferably, the lower and upper limits of condition (12) should be changed to −0.65, especially −0.60, and −0.34, especially −0.37, respectively.

More preferably, the lower and upper limits of condition (13) should be changed to 3.5, especially 4.00, and 8.5, especially 8.0, respectively.

In accordance with the invention, it is possible to provide an easy-to-view viewing optical system that, albeit being structurally simplified by contriving an eyepiece lens system, permits viewers to view subjects while getting hold of the field of view, as well as an imaging apparatus incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The examples of the invention are now explained with reference to the accompanying drawings.

Figure 1:
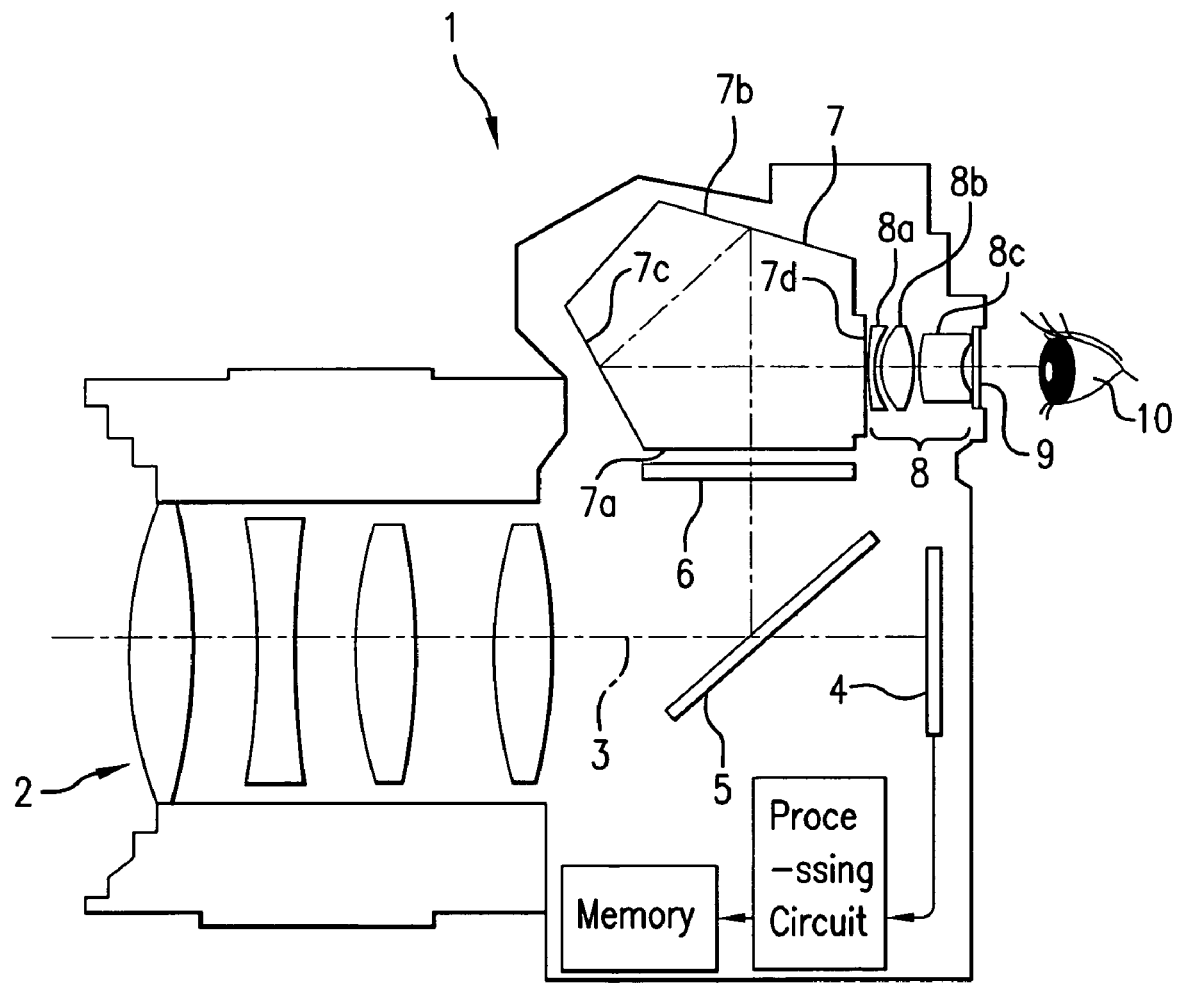
FIG. 1 is illustrative in schematic, common to the respective examples, of one embodiment of a single-lens reflex camera incorporating the inventive viewing optical system.

FIG. 1 is illustrative in schematic, common to the respective examples, of one embodiment of a single-lens reflex camera incorporating the inventive viewing optical system.

A single-lens reflex camera 1 of FIG. 1 is set up such that a taking lens 2 is interchangeably mounted on the camera by a mount (not shown). Note here that even an arrangement free of any taking lens is defined as the single-lens reflex camera (imaging apparatus) if the taking lens is mountable on it.

In FIG. 1, reference numeral 4 is indicative of a CCD (or possibly CMOS or the like) that functions as an imaging device. Based on signals from this CCD, image processing is implemented in a processing circuit to store image information in a memory. The stored image information may be displayed on a personal computer (not shown) or the like, or may be recorded and held in a variety of information recording media.

Reference numeral 5 stands for a quick return mirror located on an optical axis 3 of the taking lens 2 between the taking lens 2 and the CCD 4, and 6 indicates a finder screen located on a path taken by light reflected off the quick return mirror and having a sand-polished entrance or exit surface, on which an object image is formed.

Reference numeral 7 is indicative of a penta roof prism functioning as the image erection optical system and comprising, in optical path order, a planar entrance surface 7a, a roof reflecting surface 7b, a planar reflecting surface 7c and a planar exit surface 7d to erect an object image formed on the screen surface. While a Porro or other prism capable of reflecting the path taken by light may be used as the image erection optical system, it is understood that the penta roof prism is more advantageous for size reductions. Reference numeral 8 is an eyepiece lens system.

The penta roof prism and eyepiece lens system are set up in some forms described in the following examples.

On the exit side of the eyepiece lens system 8 there is a plane-parallel plate 9 provided that functions as a cover glass. This cover glass may be dispensed with if a lens component of the eyepiece lens system on the exit pupil side is used as that cover glass.

And a light beam leaving the eyepiece lens system 8 is guided to the viewer's pupil 10 positioned near an exit pupil so that the image to be taken is viewed.

Note here that the single-lens reflex camera may be designed such that the taking lens 2 is integral with the body of the single-lens reflex camera: it is not interchangeably mounted on the single-lens reflex camera.

In place of the quick return mirror 5, it is acceptable to use a half-silvered mirror or an optical path splitting prism.

The screen surface 6 may be made up of, not the sand-polished surface, a set of two-dimensionally arrayed microprism facets, a hologram surface or the like.

The surface opposing the screen surface 6 may be made up of an optical surface having converging action such as a Fresnel or convex surface to enhance collecting action around the screen.

If optical refracting power is given to the entrance or exit surface of the prism functioning as the image erection optical system or there is a field lens located near the screen surface 6, it is then possible to introduce a lot more improvement in correction of aberrations, light collection efficiency, etc.

Figure 2A:
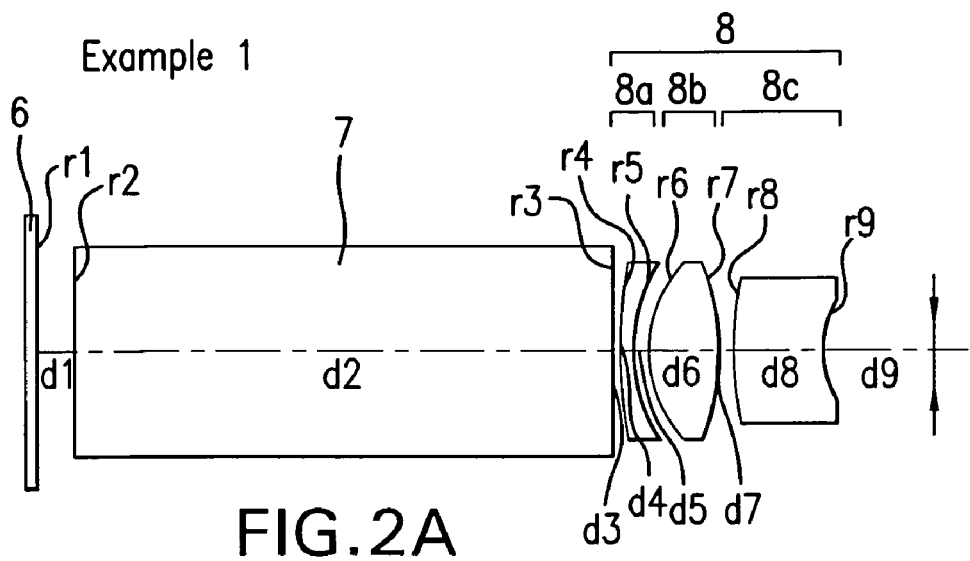
FIG. 2 is illustrative in section and along an optical axis of the optical arrangement of the first example of the inventive viewing optical system and imaging apparatus.
Figure 2B:
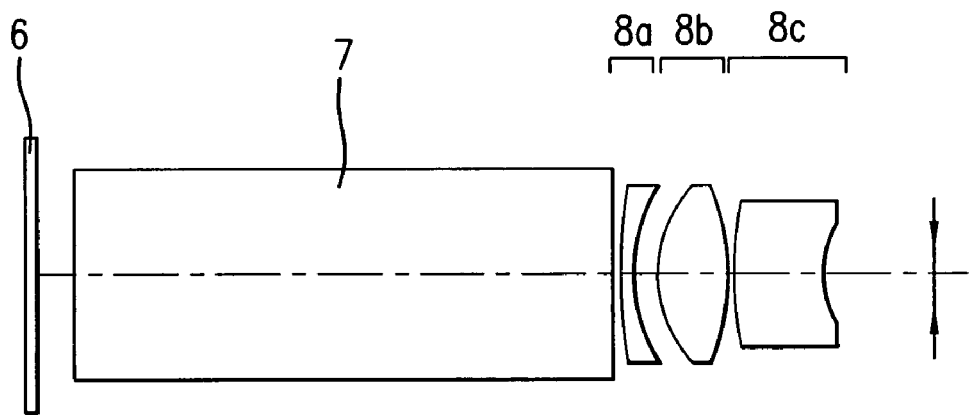
Figure 2C:
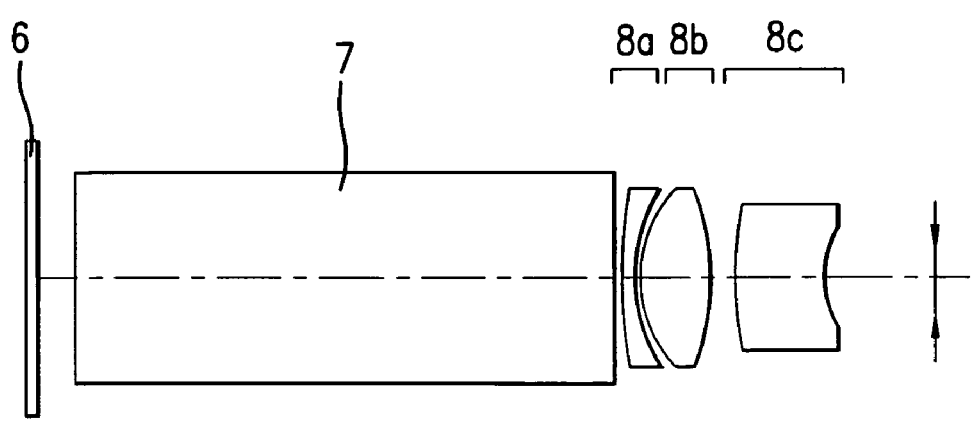

FIG. 2 is illustrative in section and along an optical axis of the optical arrangement of the first example of the inventive viewing optical system and imaging apparatus: FIG. 2(a), 2(b) and 2(c) are illustrative of states at diopters of $-1$ $m^{-1}$, $+1$ $m^{-1}$, and $-3$ $m^{-1}$, respectively.

For the sake of illustration, FIG. 2 shows the plane-parallel plate member as the taken-apart penta roof prism. The cover glass is calculated on an air basis, and is not shown in FIG. 2. This will go for the following examples.

The viewing optical system and imaging apparatus of the first example comprise a focusing screen 6 having a sand-polished surface on which an object image is formed, a penta roof prism 7 and an eyepiece lens system 8.

The eyepiece lens system 8 is made up of, in order from the screen side, a first lens 8a that is a negative meniscus lens convex on its screen side, a second lens 8b that is a double-convex positive lens, and a third lens 8c that is a negative meniscus lens convex on its screen side, with diopter adjustment implemented by moving the second lens 8b.

Three aspheric surfaces are used: one at the exit pupil side surface of the first lens 8a that is a negative meniscus lens and two at both surfaces of the second lens 8b that is a double-convex positive lens.

Figure 3A:
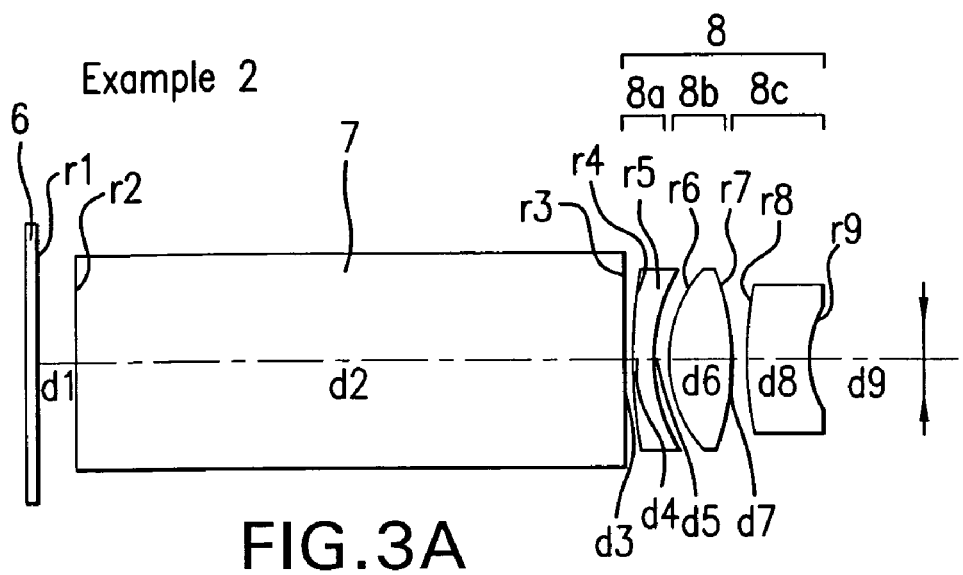
FIG. 3 is illustrative in section and along an optical axis of the optical arrangement of the second example of the inventive viewing optical system and imaging apparatus.
Figure 3B:
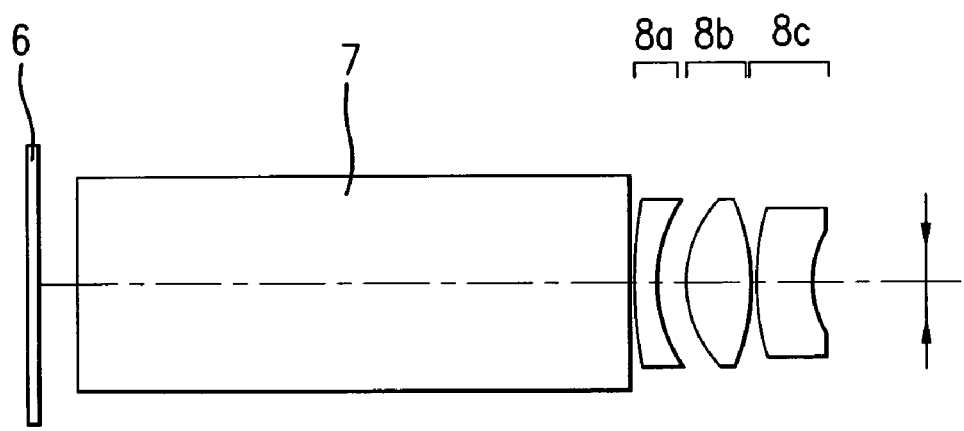
Figure 3C:
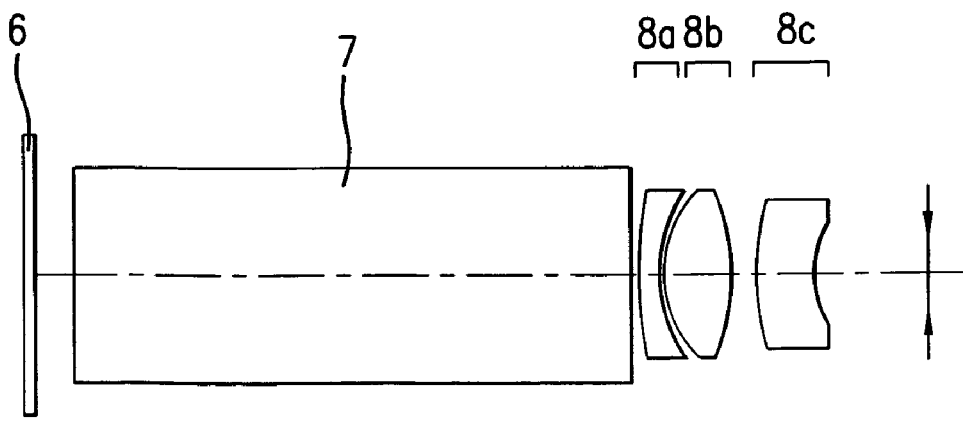

FIG. 3 is illustrative in section and along an optical axis of the optical arrangement of the second example of the inventive viewing optical system and imaging apparatus: FIG. 3(a), 3(b) and 3(c) are illustrative of states at diopters of $-1$ $m^{-1}$, $+1$ $m^{-1}$, and $-3$ $m^{-1}$, respectively.

The viewing optical system and imaging apparatus of the second example comprise a focusing screen 6 having a sand-polished surface on which an object image is formed, a penta roof prism 7 and an eyepiece lens system 8.

The eyepiece lens system 8 is made up of, in order from the screen side, a first lens 8a that is a negative meniscus lens convex on its screen side, a second lens 8b that is a double-convex positive lens, and a third lens 8c that is a negative meniscus lens convex on its screen side, with diopter adjustment implemented by moving the second lens 8b.

Three aspheric surfaces are used: one at the exit pupil side surface of the first lens 8a that is a negative meniscus lens and two at both surfaces of the second lens 8b that is a double-convex positive lens.

Figure 4A:
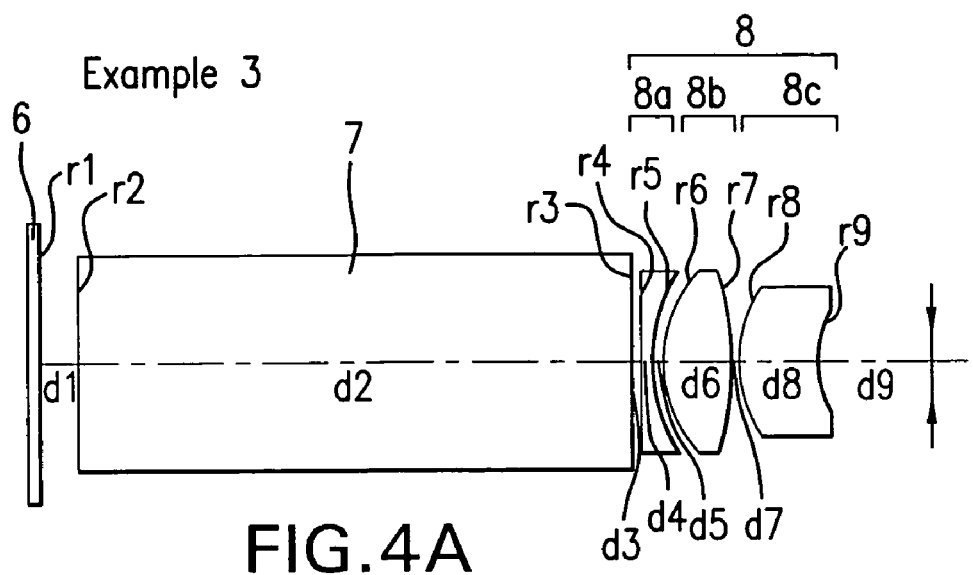
FIG. 4 is illustrative in section and along an optical axis of the optical arrangement of the third example of the inventive viewing optical system and imaging apparatus.
Figure 4B:
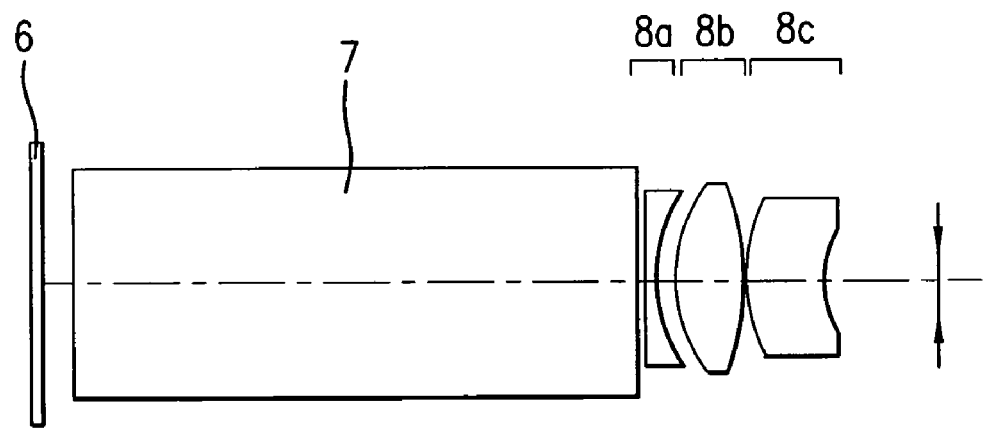
Figure 4C:
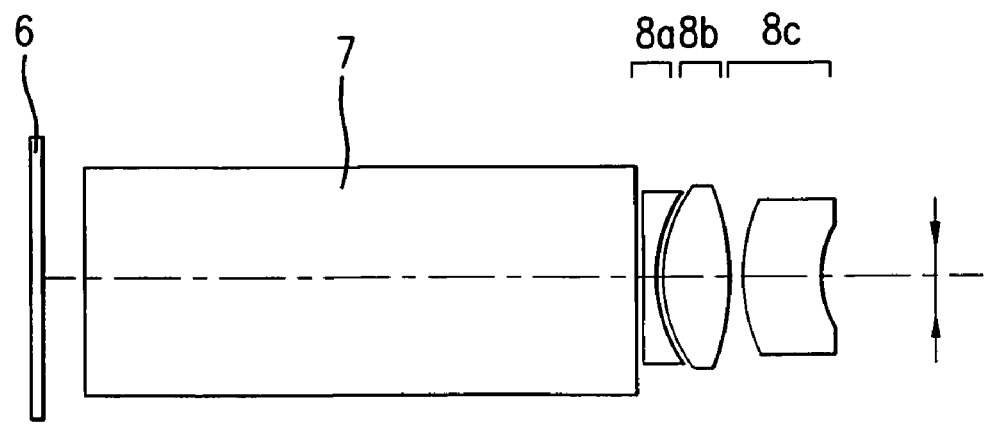

FIG. 4 is illustrative in section and along an optical axis of the optical arrangement of the third example of the inventive viewing optical system and imaging apparatus: FIG. 4(a), 4(b) and 4(c) are illustrative of states at diopters of $-1$ $m^{-1}$, $+1$ $m^{-1}$, and $-3$ $m^{-1}$, respectively.

The viewing optical system and imaging apparatus of the third example comprise a focusing screen 6 having a sand-polished surface on which an object image is formed, a penta roof prism 7 and an eyepiece lens system 8.

The eyepiece lens system 8 is made up of, in order from the screen side, a first lens 8a that is a plano-concave negative lens that is planar on its screen side, a second lens 8b that is a double-convex positive lens, and a third lens 8c that is a negative meniscus lens convex on its screen side, with diopter adjustment implemented by moving the second lens 8b.

Three aspheric surfaces are used: one at the exit pupil side surface of the first lens 8a that is a plano-concave negative lens and two at both surfaces of the second lens 8b that is a double-convex positive lens.

Figure 5A:
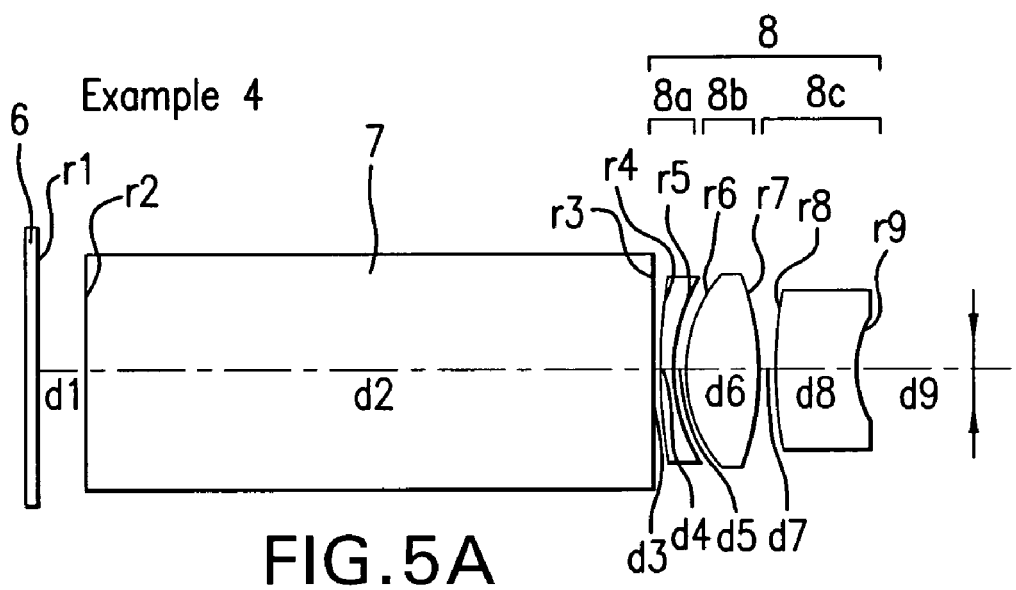
FIG. 5 is illustrative in section and along an optical axis of the optical arrangement of the fourth example of the inventive viewing optical system and imaging apparatus.
Figure 5B:
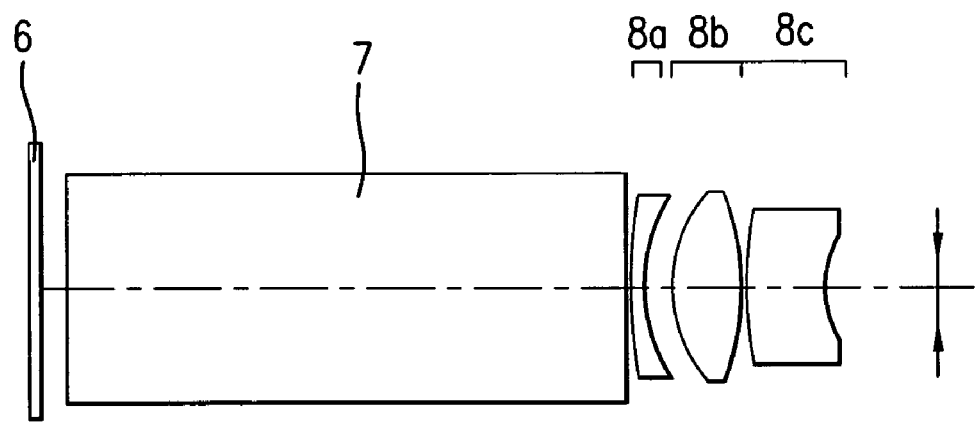
Figure 5C:
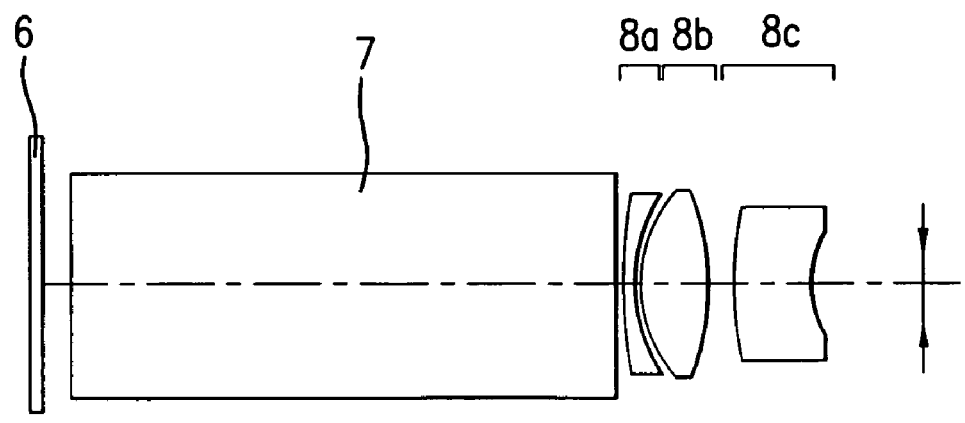

FIG. 5 is illustrative in section and along an optical axis of the optical arrangement of the fourth example of the inventive viewing optical system and imaging apparatus: FIG. 5(a), 5(b) and 5(c) are illustrative of states at diopters of $-1$ $m^{-1}$, $+1$ $m^{-1}$, and $-3$ $m^{-1}$, respectively.

The viewing optical system and imaging apparatus of the fourth example comprise a focusing screen 6 having a sand-polished surface on which an object image is formed, a penta roof prism 7 and an eyepiece lens system 8.

The eyepiece lens system 8 is made up of, in order from the screen side, a first lens 8a that is a negative meniscus lens convex on its screen side, a second lens 8b that is a double-convex positive lens, and a third lens 8c that is a negative meniscus lens convex on its screen side, with diopter adjustment implemented by moving the second lens 8b.

Three aspheric surfaces are used: two at both surfaces of the first lens 8b that is a double-convex positive lens and one at the screen side surface of the second lens 8c that is a negative meniscus lens.

Figure 6A:
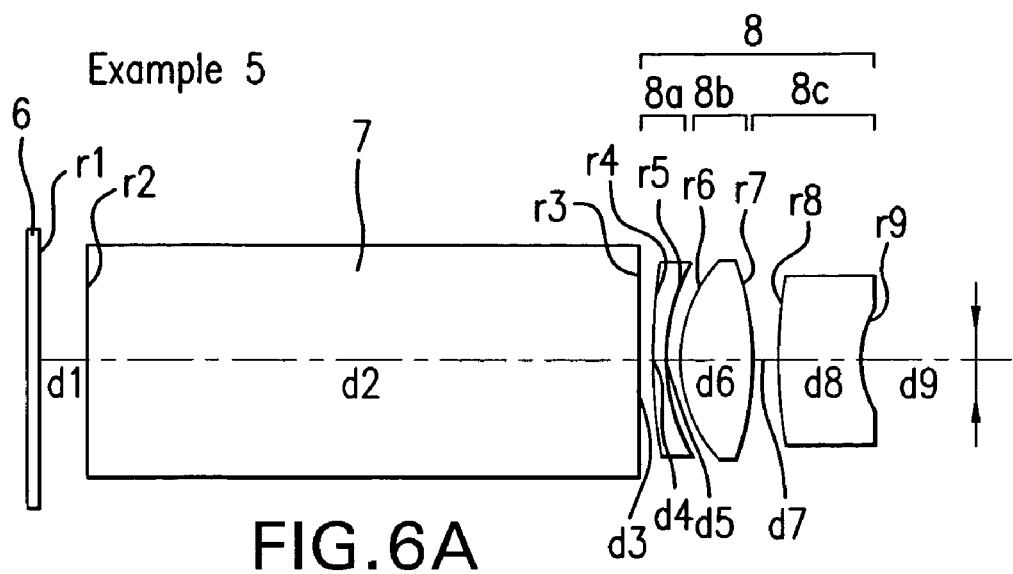
FIG. 6 is illustrative in section and along an optical axis of the optical arrangement of the fifth example of the inventive viewing optical system and imaging apparatus.
Figure 6B:
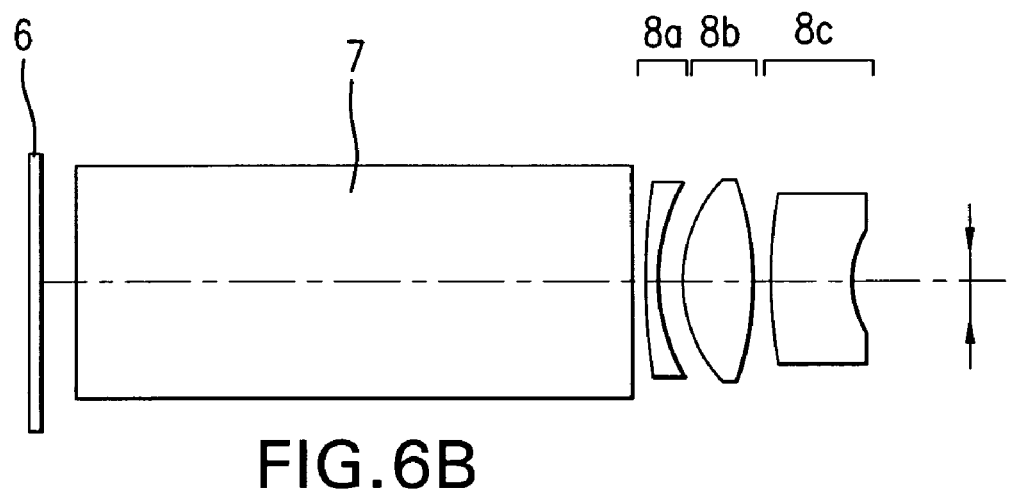
Figure 6C:
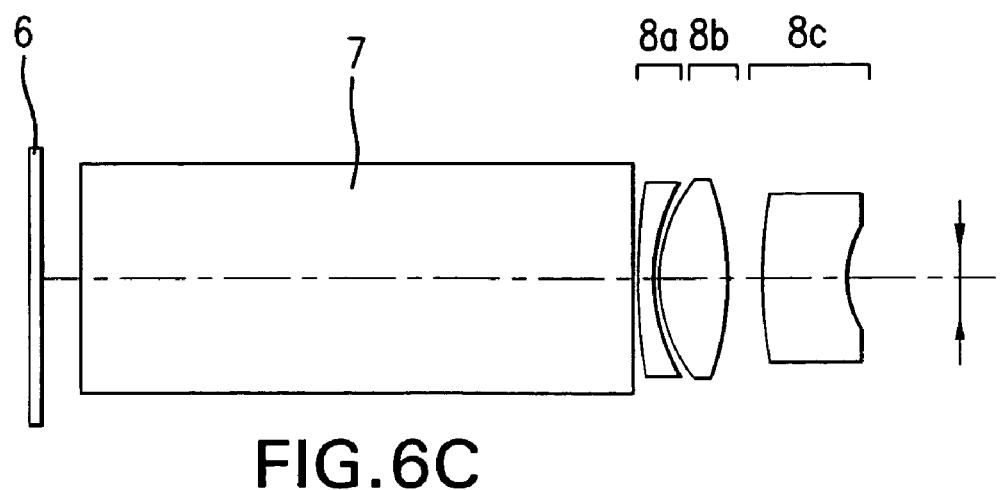

FIG. 6 is illustrative in section and along an optical axis of the optical arrangement of the fifth example of the inventive viewing optical system and imaging apparatus: FIG. 6(*a*), 6(*b*) and 6(*c*) are illustrative of states at diopters of $-1$ m$^{-1}$, $+1$ m$^{-1}$, and $-3$ m$^{-1}$, respectively.

The viewing optical system and imaging apparatus of the fifth example comprise a focusing screen 6 having a sand-polished surface on which an object image is formed, a penta roof prism 7 and an eyepiece lens system 8.

The eyepiece lens system 8 is made up of, in order from the screen side, a first lens 8a that is a negative meniscus lens convex on its screen side, a second lens 8b that is a double-convex positive lens, and a third lens 8c that is a negative meniscus lens convex on its screen side, with diopter adjustment implemented by moving the second lens 8b.

Three aspheric surfaces are used: one at the exit pupil side surface of the first lens 8a that is a negative meniscus lens and two at both surfaces of the second lens 8b that is a double-convex positive lens.

Figure 7A:
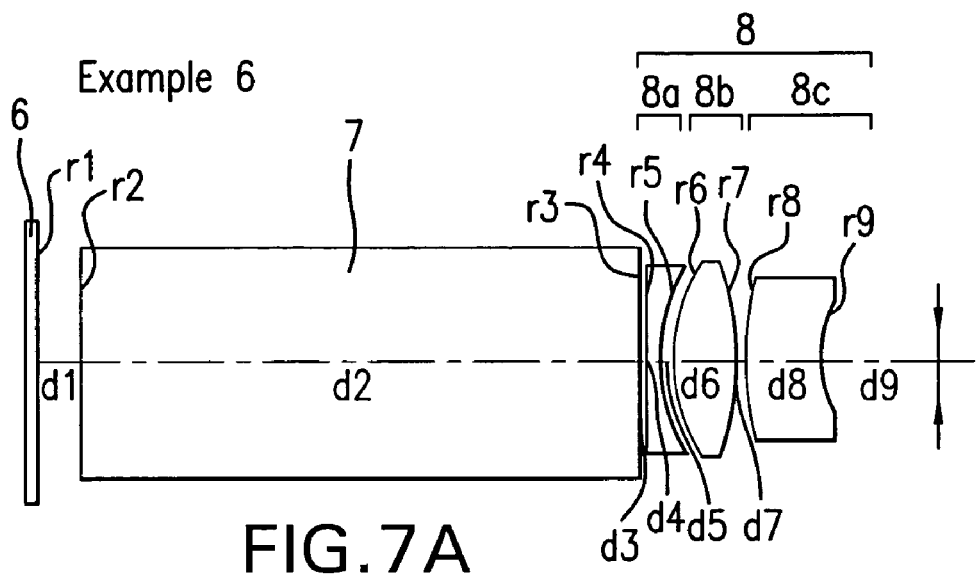
FIG. 7 is illustrative in section and along an optical axis of the optical arrangement of the sixth example of the inventive viewing optical system and imaging apparatus.
Figure 7B:
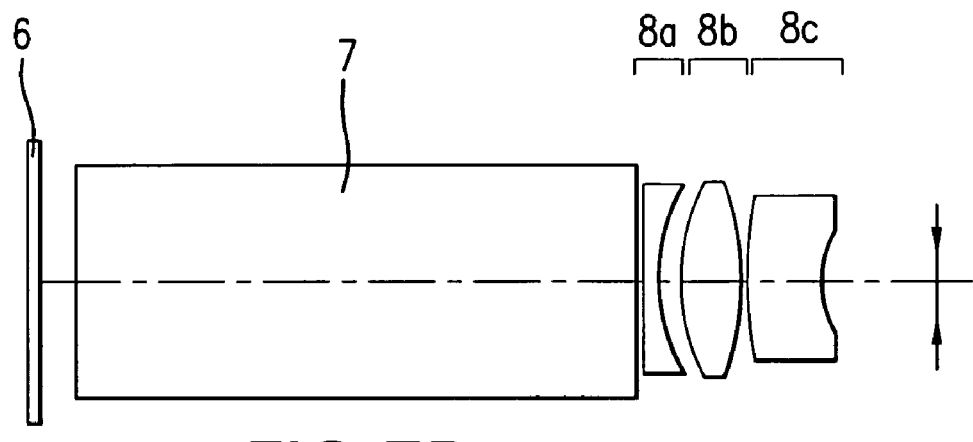
Figure 7C:
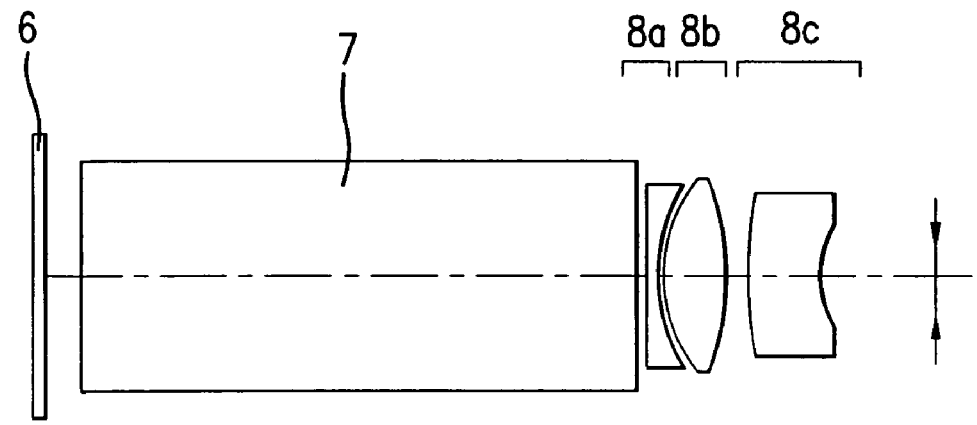
Figure 8A:
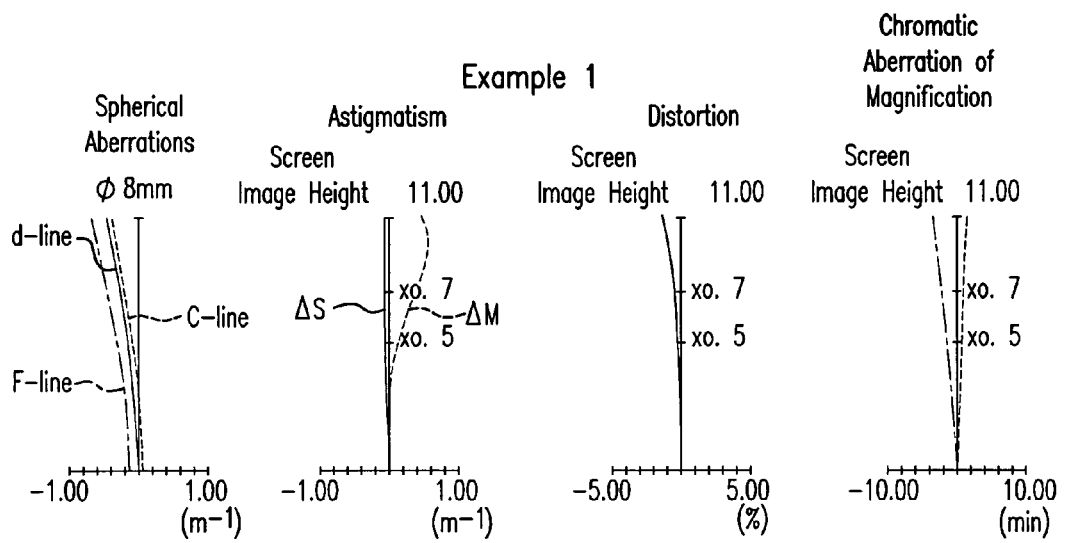
FIG. 8 is indicative of spherical aberrations, field curvature, distortion and chromatic aberration of magnification in the first example.
Figure 8B:
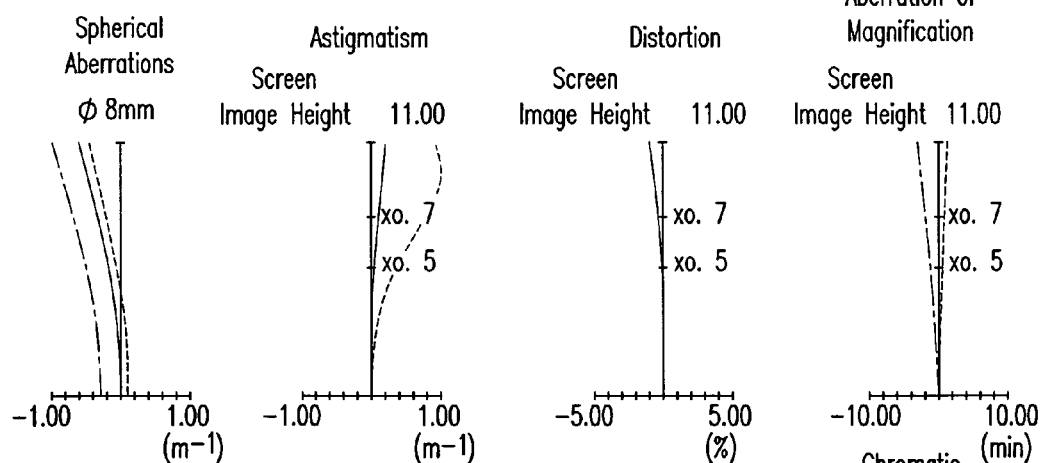
Figure 8C:
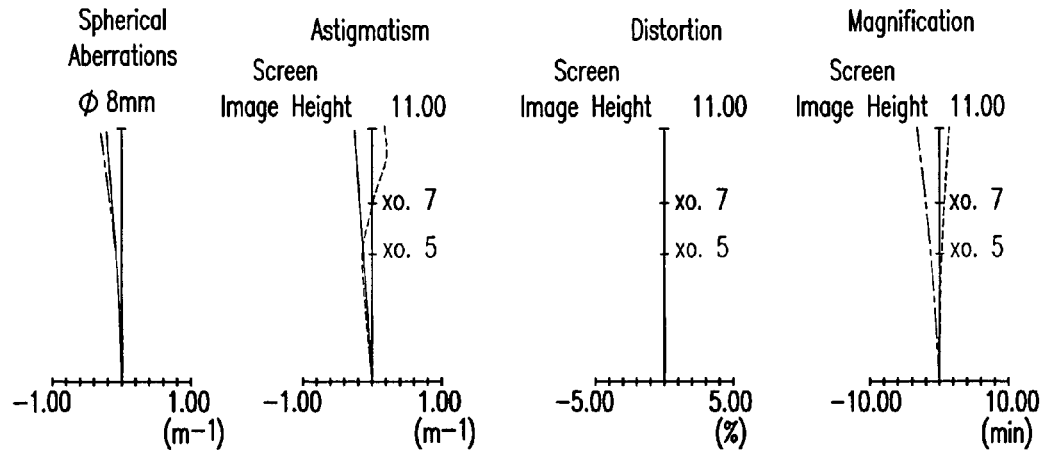
Figure 9A:
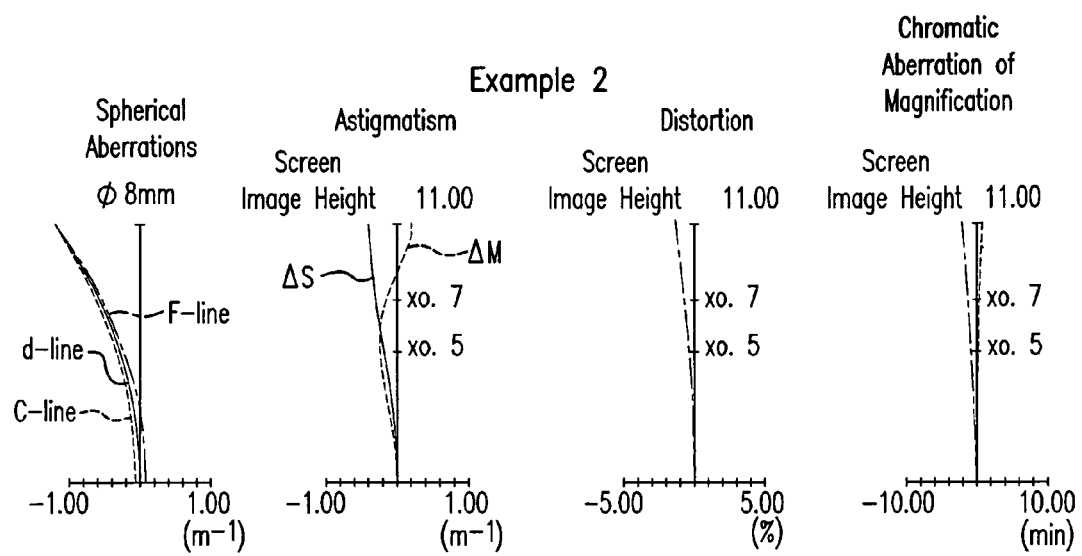
FIG. 9 is indicative of spherical aberrations, field curvature, distortion and chromatic aberration of magnification in the second example.
Figure 9B:
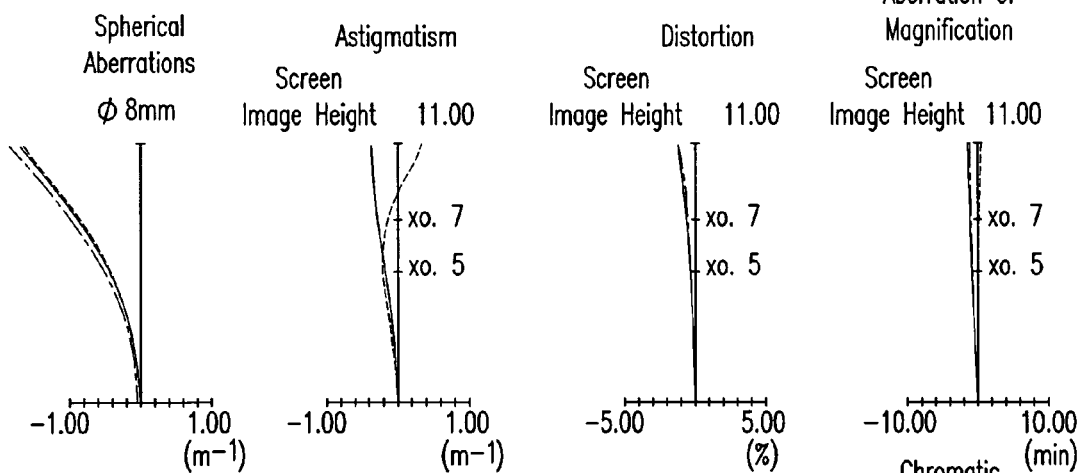
Figure 9C:
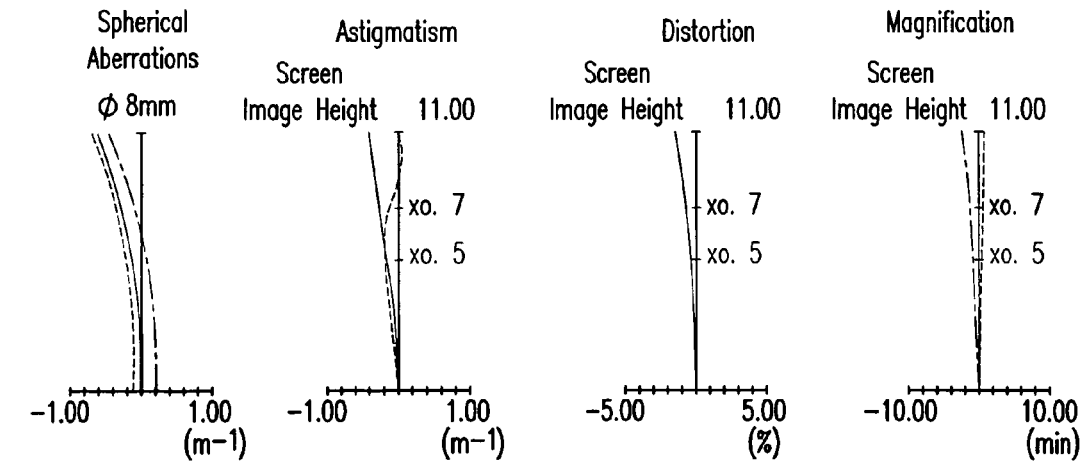
Figure 10A:
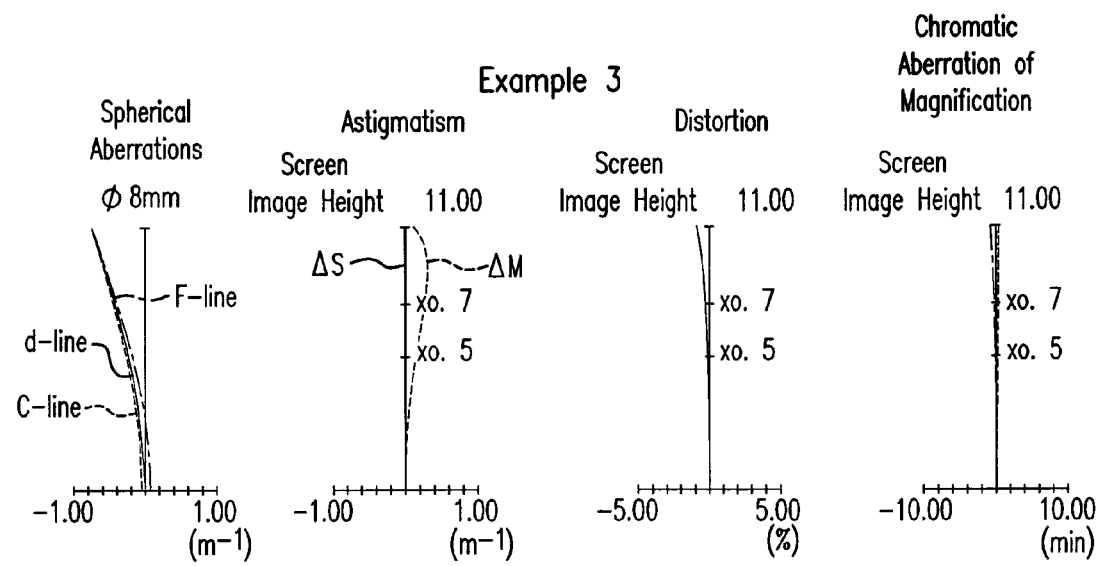
FIG. 10 is indicative of spherical aberrations, field curvature, distortion and chromatic aberration of magnification in the third example.
Figure 10B:
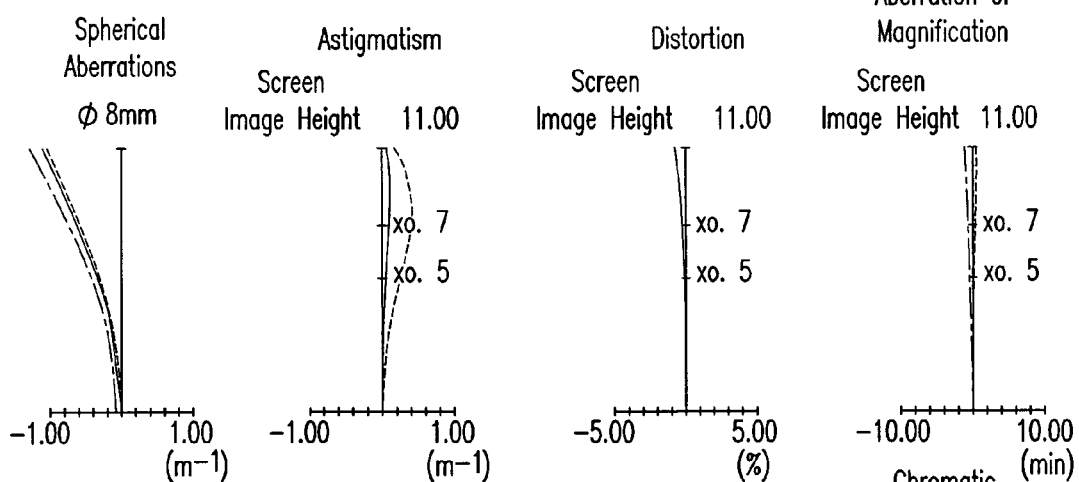
Figure 10C:
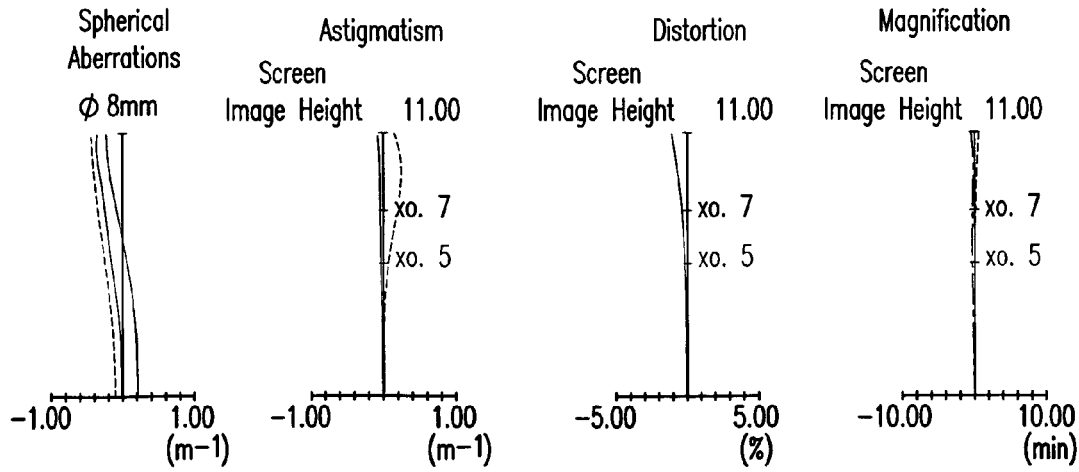
Figure 11A:
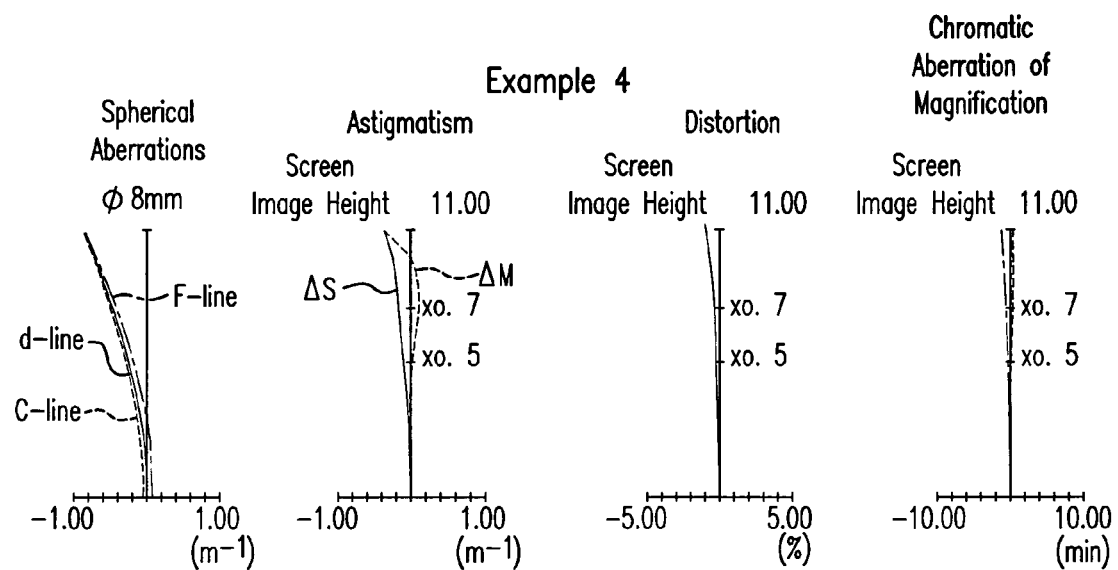
FIG. 11 is indicative of spherical aberrations, field curvature, distortion and chromatic aberration of magnification in the fourth example.
Figure 11B:
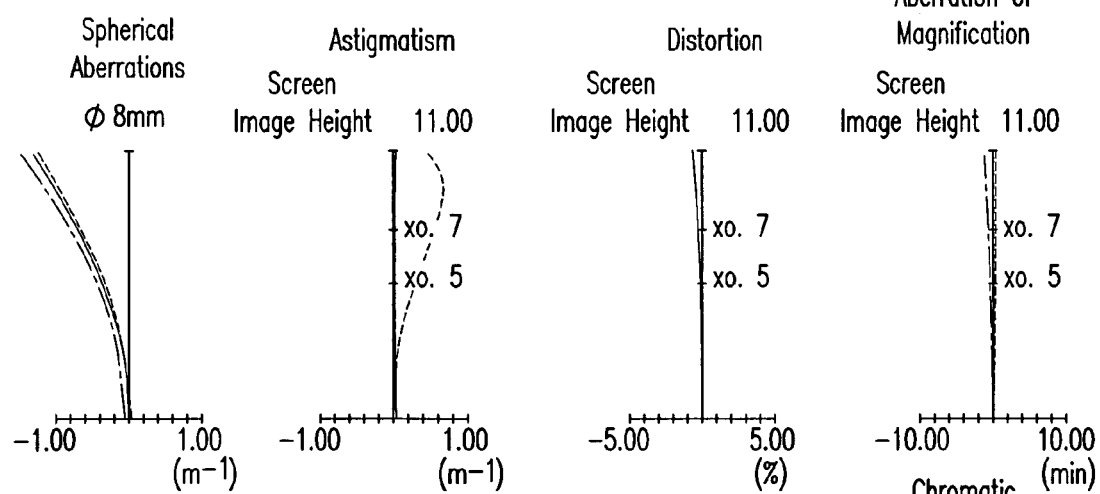
Figure 11C:
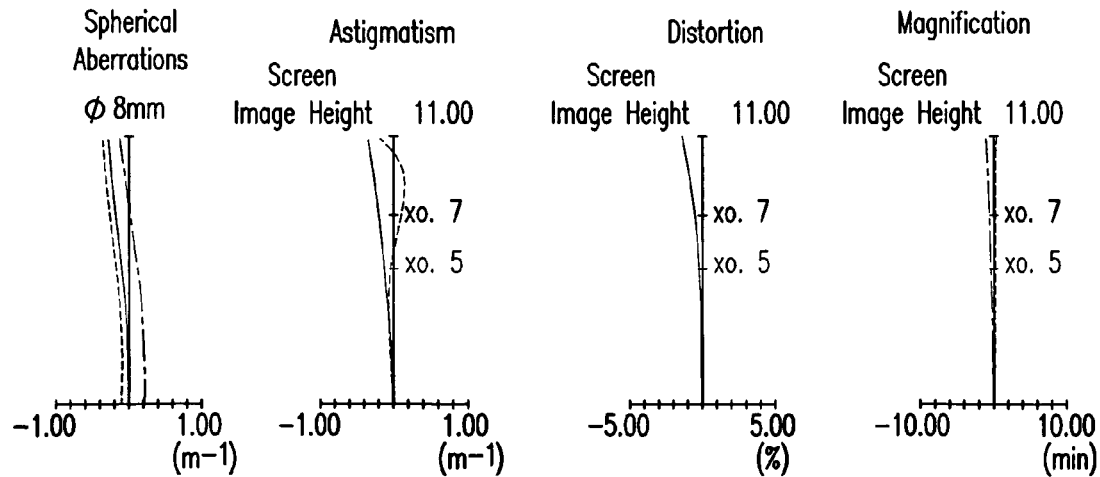
Figure 12A:
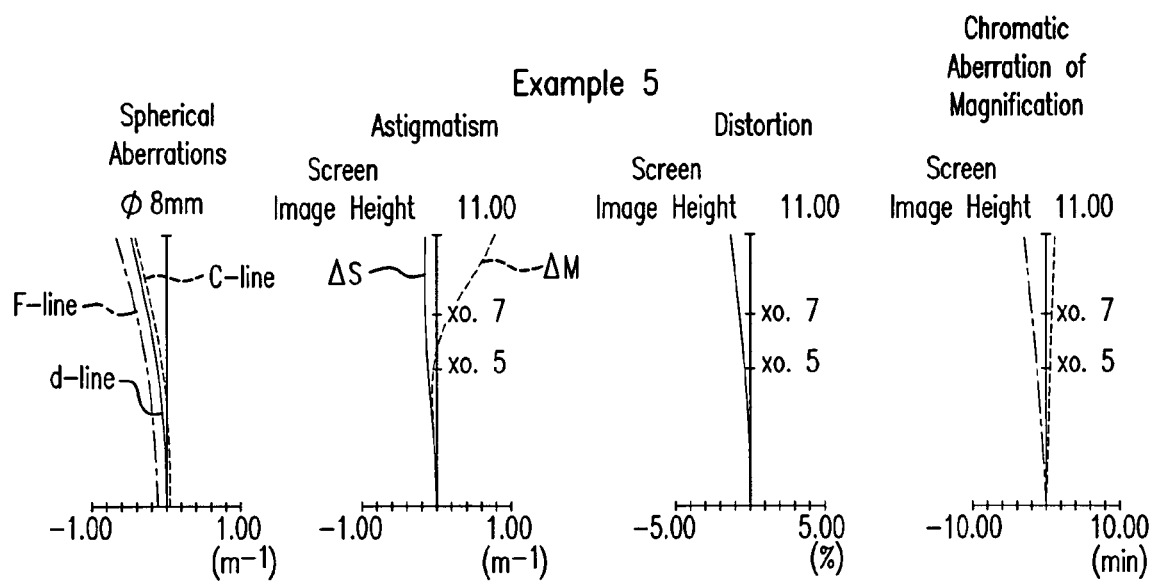
FIG. 12 is indicative of spherical aberrations, field curvature, distortion and chromatic aberration of magnification in the fifth example.
Figure 12B:
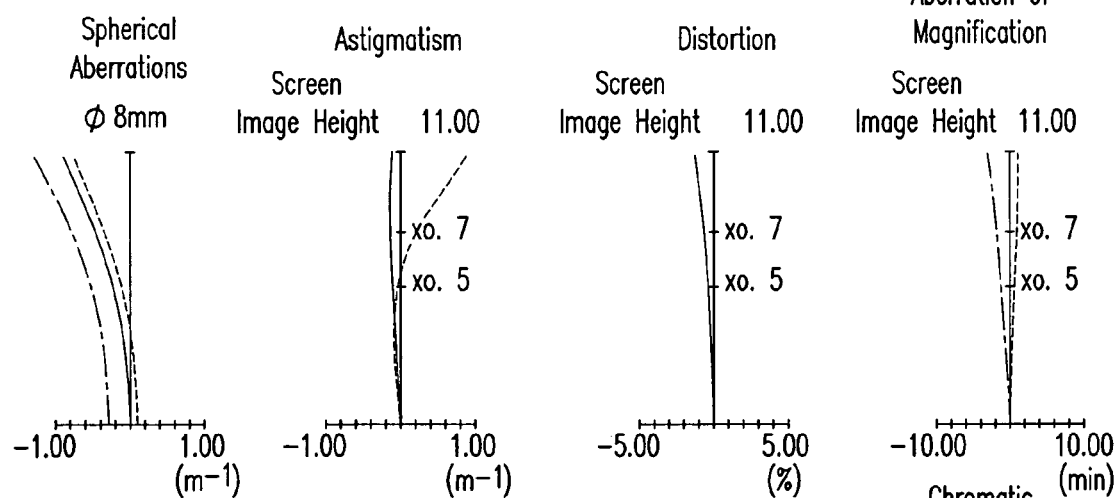
Figure 12C:
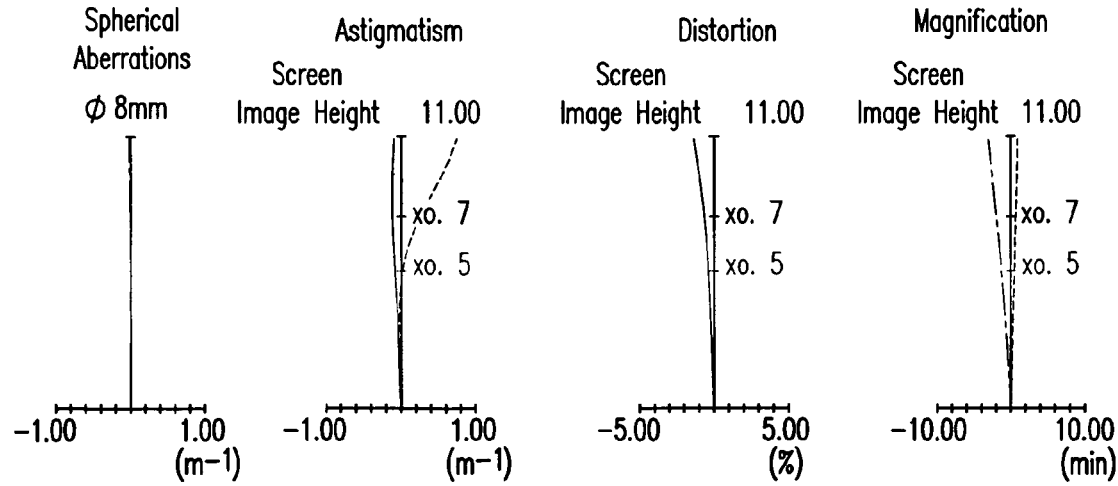
Figure 13A:
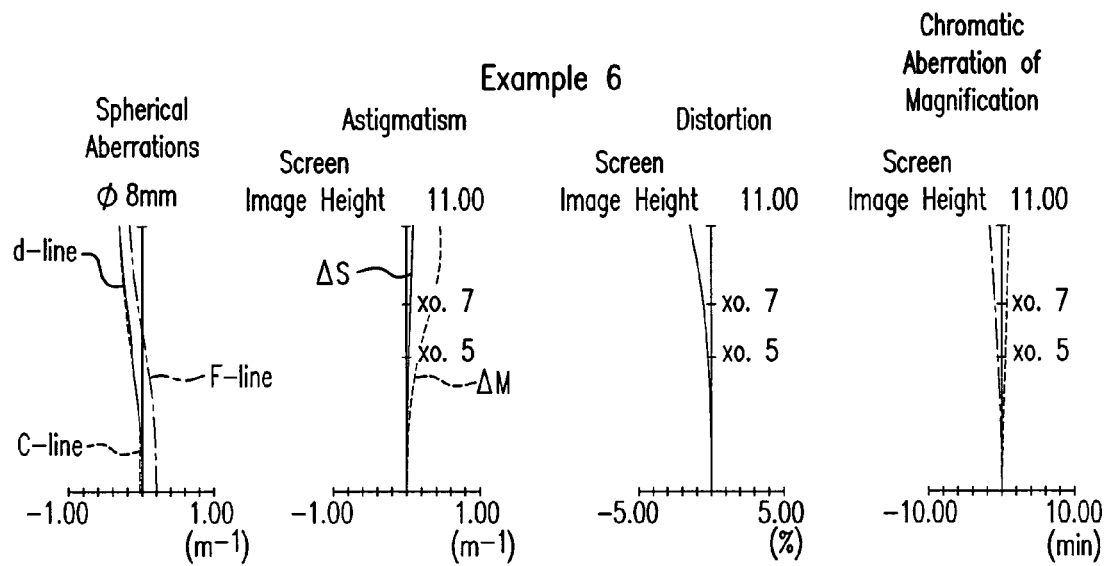
FIG. 13 is indicative of spherical aberrations, field curvature, distortion and chromatic aberration of magnification in the sixth example.
Figure 13B:
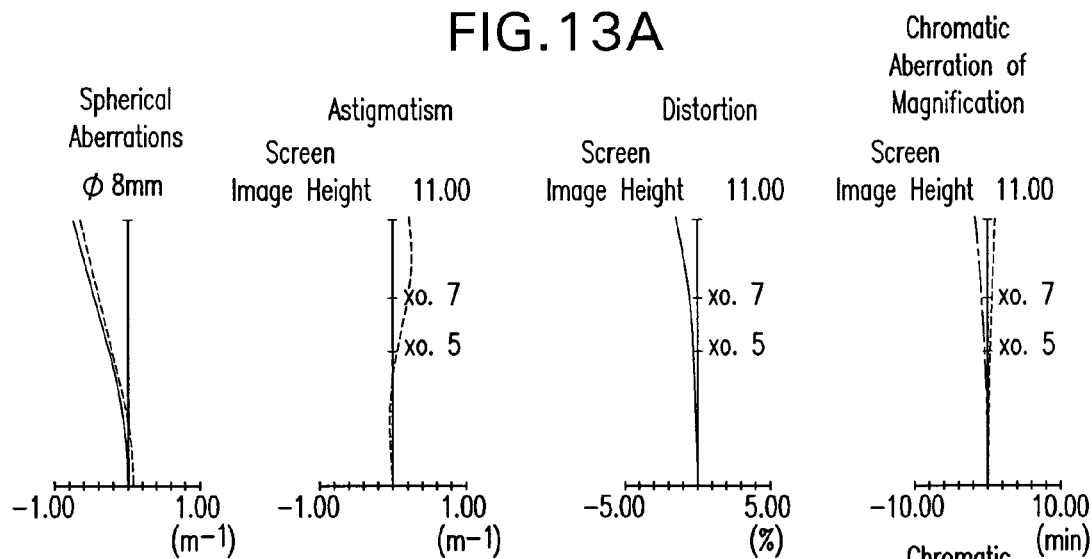
Figure 13C:
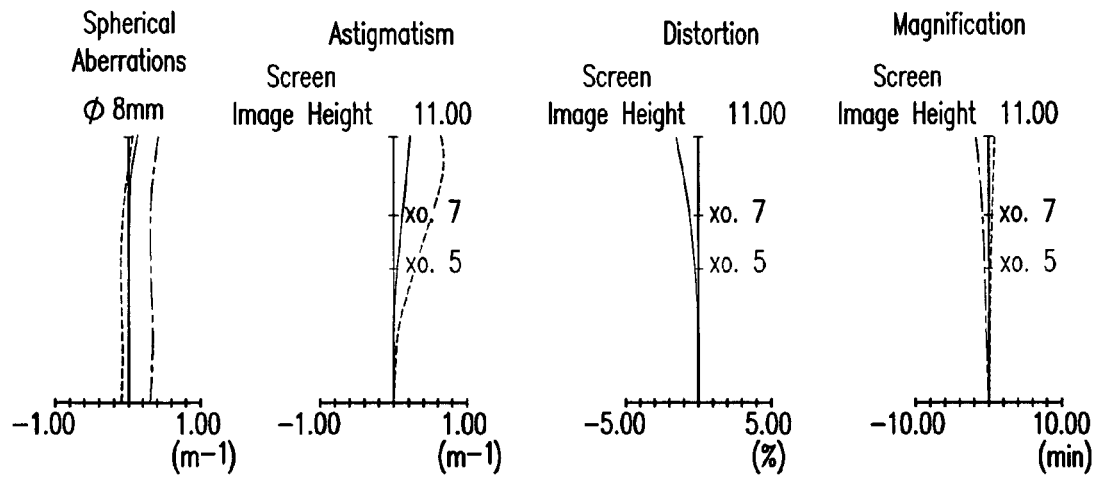

FIG. 7 is illustrative in section and along an optical axis of the optical arrangement of the sixth example of the inventive viewing optical system and imaging apparatus: FIG. 7(*a*), 7(*b*) and 7(*c*) are illustrative of states at diopters of $-1$ m$^{-1}$, $+1$ m$^{-1}$, and $-3$ m$^{-1}$, respectively.

The viewing optical system and imaging apparatus of the sixth example comprise a focusing screen 6 having a sand-polished surface on which an object image is formed, a penta roof prism 7 and an eyepiece lens system 8.

The eyepiece lens system 8 is made up of, in order from the screen side, a first lens 8a that is a plano-concave negative lens that is planar on its screen side, a second lens 8b that is a double-convex positive lens, and a third lens 8c that is a negative meniscus lens convex on its screen side, with diopter adjustment implemented by moving the second lens 8b.

Three aspheric surfaces are used: one at the exit pupil side surface of the first lens 8a that is a plano-concave negative lens and two at both surfaces of the second lens 8b that is a double-convex positive lens.

Set out just below are numerical data about the viewing optical systems according to the first to sixth examples.

In the respective examples, r is the paraxial radius of curvature of each lens surface, d is a lens thickness or air spacing, Nd and νd are the refractive index and Abbe constant at the d-line (λ=587.6 nm), respectively, K is the conic coefficient, A4, A6, A8 and A10 are the aspheric coefficients, and E±n is × 10$^{\pm n}$.

Using each aspheric coefficient in each example, each aspheric shape is given by $$Z = (Y^2/r) / \left[1 + \{1 - (1+K) \cdot (Y/r)^2\}^{1/2}\right] + A4 \times Y^4 + A6 \times Y^6 + A8 \times Y^8 + A10 \times Y^{10}$$

where Z is the coordinates in the optical axis direction, and Y is the coordinates in the vertical direction to the optical axis.

EXAMPLE 1

| Surface Data | | | | |
|---|---|---|---|---|
| Surface Number | r | d | nd | νd |
| 1 (Object Image Plane) | ∞ | 4.8 | | |
| 2 | ∞ | 73.3 | 1.5168 | 64.2 |
| 3 | ∞ | 1 | | |
| 4 | 82.5319 | 1.8 | 1.58423 | 30.49 |
| 5 (Aspheric Surface) | 22.9057 | Variable | | |
| 6 (Aspheric Surface) | 16.0429 | 9.3 | 1.52542 | 55.78 |
| 7 (Aspheric Surface) | −36.3694 | Variable | | |
| 8 | 56.8988 | 12.2 | 1.49236 | 57.86 |
| 9 | 17.6494 | 15 | | |
| Exit Pupil | ∞ | | | |

Aspheric Surface Data

5th Surface

K = −0.5215, A4 = −1.3857E−05, A6 = 1.1725E−08, A8 = 3.7397E−11, A10 = −3.3547E−13

6th Surface

K = −0.6129, A4 = −3.2469E−05, A6 = −2.9503E−08, A8 = 2.2083E−10, A10 = −2.1820E−13

7th Surface

K = −1.2109, A4 = −1.6006E−06, A6 = −1.4712E−08, A8 = 1.6337E−10, A10 = −1.2706E−13

| Various Data | | | |
|---|---|---|---|
| Diopter (m$^{-1}$) | +1 | −1 | −3 |
| d5 | 3.395 | 2.014 | 0.725 |
| d7 | 0.745 | 2.126 | 3.415 |
| Focal Length | 48.7832 | 47.9754 | 49.6796 |
| Field Angle (°) | 25.7328 | 26.0664 | 26.2011 |

| | |
|---|---|
| Pupil Diameter (Diameter) | φ = 8 |
| Diagonal Length of Object Image | 22 mm |

| Focal Length of the lens | |
|---|---|
| 1st lens | −54.879 |
| 2nd lens | 22.567 |
| 3rd lens | −57.904 |

Unit mm

EXAMPLE 2

Surface Data

| Surface Number | r | d | nd | νd |
|---|---|---|---|---|
| 1 (Object Image Plane) | ∞ | 4.8 | | |
| 2 | ∞ | 73.3 | 1.5168 | 64.2 |
| 3 | ∞ | 0.8 | | |
| 4 | 75.0796 | 2.8 | 1.58423 | 30.49 |
| 5 (Aspheric Surface) | 22.341 | Variable | | |
| 6 (Aspheric Surface) | 14.6988 | 9.1 | 1.52542 | 55.78 |
| 7 (Aspheric Surface) | −32.9176 | Variable | | |
| 8 | 47.0751 | 7.5 | 1.8061 | 40.92 |
| 9 | 18.9104 | 15 | | |
| Exit Pupil | ∞ | | | |

Aspheric Surface Data

5th Surface $K = -0.0529, A4 = -5.4215E-06, A6 = -9.7564E-08, A8 = 1.7451E-10, A10 = 1.0562E-13$ 6th Surface $K = -0.5800, A4 = -1.9103E-05, A6 = -1.7948E-07, A8 = -7.1919E-11, A10 = 3.6418E-12$ 7th Surface $K = -4.2569, A4 = -3.0052E-06, A6 = -9.8448E-08, A8 = 3.8044E-10, A10 = 1.2979E-12$

Various Data

| Diopter (m$^{-1}$) | +1 | −1 | −3 |
|---|---|---|---|
| d5 | 3.717 | 2.029 | 0.600 |
| d7 | 0.700 | 2.388 | 3.817 |
| Focal Length | 49.5610 | 49.4495 | 49.5691 |
| Field Angle (°) | 24.8972 | 25.8470 | 26.4151 |

| | |
|---|---|
| Pupil Diameter (Diameter) | φ = 8 |
| Diagonal Length of Object Image | 22 mm |

Focal Length of the lens

| | |
|---|---|
| 1st lens | −55.5262 |
| 2nd lens | 20.6863 |
| 3rd lens | −44.4303 |

Unit mm

EXAMPLE 3

Surface Data

| Surface Number | r | d | nd | νd |
|---|---|---|---|---|
| 1 (Object Image Plane) | ∞ | 4.8 | | |
| 2 | ∞ | 73.3 | 1.5168 | 64.2 |
| 3 | ∞ | 1 | | |
| 4 | ∞ | 1.8 | 1.58423 | 30.49 |
| 5 (Aspheric Surface) | 21.4665 | Variable | | |
| 6 (Aspheric Surface) | 15.3104 | 8.8 | 1.52542 | 55.78 |
| 7 (Aspheric Surface) | −34.1421 | Variable | | |
| 8 | 24.902 | 10.2 | 1.8061 | 40.92 |
| 9 | 15.3564 | 15 | | |
| Exit Pupil | ∞ | | | |

Aspheric Surface Data

5th Surface $K = -0.6215, A4 = -1.4562E-05, A6 = 3.2902E-08, A8 = -1.8656E-10, A10 = -6.6707E-14$ 6th Surface $K = -0.7522, A4 = -4.3141E-05, A6 = 2.9318E-08, A8 = 1.1875E-11, A10 = -6.6748E-14$ 7th Surface $K = -0.5090, A4 = -9.6141E-06, A6 = 2.3294E-08, A8 = 4.0506E-11, A10 = -9.4520E-14$

Various Data

| Diopter (m$^{-1}$) | +1 | −1 | −3 |
|---|---|---|---|
| d5 | 2.100 | 1.350 | 0.600 |
| d7 | 0.500 | 1.250 | 2.000 |
| Focal Length | 46.8357 | 48.8523 | 51.0896 |
| Field Angle (°) | 26.2971 | 26.0901 | 25.8185 |

| | |
|---|---|
| Pupil Diameter (Diameter) | φ = 8 |
| Diagonal Length of Object Image | 22 mm |

Focal Length of the lens

| | |
|---|---|
| 1st lens | −36.7433 |
| 2nd lens | 21.4315 |
| 3rd lens | −95.0094 |

Unit mm

EXAMPLE 4

Surface Data

| Surface Number | r | d | nd | νd |
|---|---|---|---|---|
| 1 (Object Image Plane) | ∞ | 4.8 | | |
| 2 | ∞ | 73.3 | 1.5168 | 64.2 |
| 3 | ∞ | 0.8 | | |
| 4 | 60.8895 | 1.8 | 1.80518 | 25.42 |
| 5 | 26.0505 | Variable | | |
| 6 (Aspheric Surface) | 16.0922 | 9.3 | 1.52542 | 55.78 |
| 7 (Aspheric Surface) | −36.9303 | Variable | | |
| 8 (Aspheric Surface) | 52.735 | 10.5 | 1.49236 | 57.86 |
| 9 | 17.6826 | 15 | | |
| Exit Pupil | ∞ | | | |

Aspheric Surface Data

6th Surface $K = -0.6251, A4 = -1.9397E-05, A6 = -7.1378E-08, A8 = 2.2342E-10, A10 = 4.7558E-13$ 7th Surface $K = -0.1438, A4 = -1.5075E-05, A6 = 2.3309E-08, A8 = -1.6146E-11, A10 = 5.5798E-13$ 8th Surface $K = 0.0000, A4 = -1.4882E-05, A6 = 3.1965E-08, A8 = -5.1603E-10$

Various Data

| Diopter (m$^{-1}$) | +1 | −1 | −3 |
|---|---|---|---|
| d5 | 3.411 | 1.948 | 0.600 |
| d7 | 0.600 | 2.063 | 3.411 |

-continued

| | | | |
|---|---|---|---|
| Focal Length | 48.0967 | 48.7848 | 49.5541 |
| Field Angle (°) | 25.5157 | 26.0279 | 26.2650 |

| | |
|---|---|
| Pupil Diameter (Diameter) | $\phi = 8$ |
| Diagonal Length of Object Image | 22 mm |

Focal Length of the lens

| | |
|---|---|
| 1st lens | −57.8795 |
| 2nd lens | 22.7036 |
| 3rd lens | −59.9564 |

Unit mm

EXAMPLE 5

Surface Data

| Surface Number | r | d | nd | vd |
|---|---|---|---|---|
| 1 (Object Image Plane) | ∞ | 4.8 | | |
| 2 | ∞ | 73.3 | 1.5168 | 64.2 |
| 3 | ∞ | 1 | | |
| 4 | 82.154 | 1.8 | 1.58423 | 30.49 |
| 5 (Aspheric Surface) | 22.1293 | Variable | | |
| 6 (Aspheric Surface) | 15.8744 | 9.5 | 1.52542 | 55.78 |
| 7 (Aspheric Surface) | −36.0202 | Variable | | |
| 8 | 53.508 | 10.95 | 1.49236 | 57.86 |
| 9 | 17.486 | 15 | | |
| Exit Pupil | ∞ | | | |

Aspheric Surface Data

5th Surface $K = -0.3835, A4 = -8.1079E-06, A6 = -3.6738E-08, A8 = 8.9470E-11, A10 = -1.7355E-13$ 6th Surface $K = -0.5533, A4 = -2.1662E-05, A6 = -7.5108E-08, A8 = 2.1634E-10, A10 = -5.3330E-13$ 7th Surface $K = -2.4722, A4 = 2.2133E-06, A6 = -2.5585E-08, A8 = 7.8882E-11, A10 = -2.3889E-13$ Various Data

| Diopter (m$^{-1}$) | +1 | −1 | −3 |
|---|---|---|---|
| d5 | 3.368 | 2.065 | 0.836 |
| d7 | 2.082 | 3.385 | 4.614 |
| Focal Length | 48.2045 | 49.1622 | 50.2154 |
| Field Angle (°) | 25.7045 | 25.9110 | 25.9316 |

| | |
|---|---|
| Pupil Diameter (Diameter) | $\phi = 8$ |
| Diagonal Length of Object Image | 22 mm |

Focal Length of the lens

| | |
|---|---|
| 1st lens | −52.4218 |
| 2nd lens | 22.3821 |
| 3rd lens | −58.6348 |

Unit mm

EXAMPLE 6

Surface Data

| Surface Number | r | d | nd | vd |
|---|---|---|---|---|
| 1 (Object Image Plane) | ∞ | 4.8 | | |
| 2 | ∞ | 73.3 | 1.5168 | 64.2 |
| 3 | ∞ | 1 | | |
| 4 | ∞ | 1.8 | 1.58423 | 30.49 |
| 5 (Aspheric Surface) | 25.2545 | Variable | | |
| 6 (Aspheric Surface) | 19.4714 | 8 | 1.52542 | 55.78 |
| 7 (Aspheric Surface) | −48.4611 | Variable | | |
| 8 | 49.8666 | 10 | 1.49236 | 57.86 |
| 9 | 17.4054 | 15 | | |
| Exit Pupil | ∞ | | | |

Aspheric Surface Data

5th Surface $K = -3.8867, A4 = 2.3551E-05, A6 = -1.0626E-07, A8 = 1.9716E-10, A10 = -7.2329E-14$ 6th Surface $K = -0.2495, A4 = -2.4464E-05, A6 = -4.4799E-08, A8 = 1.6857E-10, A10 = -3.4462E-13$ 7th Surface $K = 2.5887, A4 = -9.1646E-07, A6 = 4.4658E-08, A8 = -1.4185E-10, A10 = 2.4773E-13$ Various Data

| Diopter (m$^{-1}$) | +1 | −1 | −3 |
|---|---|---|---|
| d5 | 2.700 | 1.618 | 0.600 |
| d7 | 0.700 | 1.782 | 2.800 |
| Focal Length | 48.1204 | 49.3182 | 50.6255 |
| Field Angle (°) | 25.7027 | 25.9297 | 25.9841 |

| | |
|---|---|
| Pupil Diameter (Diameter) | $\phi = 8$ |
| Diagonal Length of Object Image | 22 mm |

Focal Length of the lens

| | |
|---|---|
| 1st lens | −52.4218 |
| 2nd lens | 22.3821 |
| 3rd lens | −58.6348 |

Unit mm

Tabulated below are the values of conditions (1) to (13) in the respective examples.

| Condition | Example 1 | Example 2 | Example 3 | Example 4 | Example 5 | Example 6 |
|---|---|---|---|---|---|---|
| (1) | 0.250 | 0.152 | 0.209 | 0.215 | 0.223 | 0.203 |
| (2) | 1.49236 | 1.80610 | 1.80610 | 1.49236 | 1.49236 | 1.58423 |
| (3) | 1.899 | 2.341 | 4.218 | 2.009 | 1.971 | 2.072 |
| (4) | −1.187 | −0.898 | −1.945 | −1.229 | −1.193 | −1.047 |
| (5) | 0.191 | 0.182 | 0.180 | 0.191 | 0.193 | 0.162 |
| (6) | 1.52542 | 1.52542 | 1.52542 | 1.52542 | 1.52542 | 1.74320 |
| (7) | −0.388 | −0.383 | −0.381 | −0.393 | −0.388 | −0.427 |
| (8) | 0.463 | 0.418 | 0.439 | 0.465 | 0.455 | 0.399 |
| (9) | 0.037 | 0.057 | 0.037 | 0.037 | 0.037 | 0.036 |
| (10) | 1.58423 | 1.58423 | 1.58423 | 1.80518 | 1.58423 | 1.58423 |
| (11) | 1.768 | 1.847 | 1.000 | 2.495 | 1.737 | 1.000 |
| (12) | −0.411 | −0.384 | −0.583 | −0.392 | −0.427 | −0.455 |
| (13) | 5.675 | 4.847 | 5.974 | 4.232 | 6.076 | 7.734 |

FIGS. 8 to 13 are indicative of spherical aberrations, field curvatures, distortions and chromatic aberrations of magnification in the respective examples, with (a), (b) and (c) indicative of states at diopters of $-1 m^{-1}$, $+1 m^{-1}$ and $-3 m^{-1}$, respectively. In the spherical aberrations and field curvatures of FIGS. 8 to 13, diopter ($m^{-1}$) is given as abscissa, and in the chromatic aberrations of magnification, angle (min.) is given as abscissa. For the spherical aberrations and chromatic aberrations of magnification, there are values shown, that are obtained at the respective wavelengths of 587.6 nm (d-line: solid line), 486.1 nm (F-line: one-dot line) and 656.3 nm (C-line: dotted line). For the astigmatisms, a solid line is indicative of the sagittal image plane, and a dotted line is indicative of the meridional image plane.

What is claimed is:

1. A viewing optical system comprising:
   a screen on which an object image by a taking lens is formed,
   an image erection optical system for erecting the object image formed on said screen, and
   an eyepiece lens system of positive refracting power for guiding a light beam leaving said image erection optical system to the eyeball of a viewer, wherein:
   said image erection optical system comprises a plurality of reflecting surfaces,
   said eyepiece optical system comprises, in order from a screen side to an exit pupil side,
   a first lens element of negative refracting power,
   a second lens element convex on both the screen side and the exit pupil side, and
   a third lens element that is of negative refracting power and has a meniscus shape concave on the exit pupil side, and
   said third lens element satisfies the following condition (1):

$$0.13 < DL3/fe < 0.30 \quad (1)$$

where DL3 is an axial thickness of the third lens element, and
   fe is a focal length of the eyepiece lens system provided that when the eyepiece lens system has a diopter adjustable by movement of the lenses, fe is going to be a focal length at −1 diopter.

2. The viewing optical system according to claim 1, which satisfies the following condition (2):

$$1.40 < NL3 < 2.20 \quad (2)$$

where NL3 is a d-line refractive index of the third lens element.

3. The viewing optical system according to claim 1, which satisfies the following condition (3):

$$1.6 < (RL3S+RL3E)/(RL3S-RL3E) < 4.7 \quad (3)$$

where RL3S is a paraxial radius of curvature of the third lens element on the screen side, and
   RL3E is a paraxial radius of curvature of the third lens element on the exit pupil side.

4. The viewing optical system according to claim 1, which satisfies the following condition (4):

$$-2.1 < fL3/fe < -0.8 \quad (4)$$

where fL3 is a focal length of the third lens element.

5. The viewing optical system according to claim 1, wherein any one of the convex surfaces of said second lens element is an aspheric surface configured such that an absolute value of curvature decreases with a distance from an optical axis.

6. The viewing optical system according to claim 1, wherein diopter adjustment is implemented by movement of said second lens element in an optical axis direction.

7. The viewing optical system according to claim 1, which satisfies the following condition (5):

$$0.13 < DL2/fe < 0.24 \quad (5)$$

where DL2 is an axial thickness of the second lens element.

8. The viewing optical system according to claim 1, which satisfies the following condition (6):

$$1.40 < NL2 < 2.2 \quad (6)$$

where NL2 is a d-line refractive index of the second lens element.

9. The viewing optical system according to claim 1, which satisfies the following condition (7):

$$-0.60 < (RL2S+RL2E)/RL2S-RL2E) < -0.30 \quad (7)$$

where RL2S is a paraxial radius of curvature of the second lens element on the screen side, and
   RL2E is a paraxial radius of curvature of the second lens element on the exit pupil side.

10. The viewing optical system according to claim 1, which satisfies the following condition (8):

$$0.3 < fL2/fe < 0.55 \quad (8)$$

where fL2 is a focal length of the second lens element.

11. The viewing optical system according to claim 1, which satisfies the following condition (9):

$$0.025 < DL1/fe < 0.08 \quad (9)$$

where DL1 is an axial thickness of the first lens element.

12. The viewing optical system according to claim 1, which satisfies the following condition (10):

$$1.4 < NL1 < 2.2 \quad (10)$$

where NL1 is a d-line refractive index of the first lens element.

13. The viewing optical system according to claim 1, which satisfies the following condition (11):

$$0.8 < (RL1S + RL1E)/(RL1S - RL1E) < 3.0 \quad (11)$$

where RL1S is a paraxial radius of curvature of the first lens element on the screen side, and RL1E is a paraxial radius of curvature of the first lens element on the exit pupil side.

14. The viewing optical system according to claim 1, which satisfies the following condition (12):

$$-0.70 < fL2/fL1 < -0.30 \quad (12)$$

where fL1 is a focal length of the first lens element, and
fL2 is a focal length of the second lens element.

15. The viewing optical system according to claim 1, which satisfies the following condition (13):

$$3.0 < (RL1E + RL2S)/(RL1E - RL2S) < 9.0 \quad (13)$$

where RL1E is a paraxial radius of curvature of the first lens element on the exit pupil side, and RL2S is a paraxial radius of curvature of the second lens element on the screen side.

16. The viewing optical system according to claim 1, wherein said image erection optical system is a penta roof prism having a roof reflecting surface.

17. An imaging apparatus, comprising:
an imaging device located on a taking optical path and adapted to receive and convert an image formed by the taking lens into electrical signals,
a reflecting mirror for splitting a path taken by light from the taking lens into a viewing optical path and a taking optical path, and
a viewing optical system as recited in claim 1.

* * * * *